United States Patent
Milstein et al.

(10) Patent No.: US 7,697,511 B2
(45) Date of Patent: Apr. 13, 2010

(54) SELECTIVE VOICE SWITCHING OF MULTIPARTY COMMUNICATIONS

(75) Inventors: David Milstein, Redmond, WA (US); Linda Criddle, Kirkland, WA (US); Scott C Forbes, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 380 days.

(21) Appl. No.: 11/398,966

(22) Filed: Apr. 5, 2006

(65) Prior Publication Data

US 2007/0237138 A1    Oct. 11, 2007

(51) Int. Cl.
    H04L 12/66    (2006.01)
(52) U.S. Cl. .................. 370/352; 370/260; 370/447
(58) Field of Classification Search ......... 370/252, 370/260, 352, 447; 379/202.01, 387.01; 709/239
    See application file for complete search history.

(56) References Cited

U.S. PATENT DOCUMENTS

| | | | |
|---|---|---|---|
| 6,728,358 B2 * | 4/2004 | Kwan | 379/202.01 |
| 7,180,997 B2 * | 2/2007 | Knappe | 379/387.01 |
| 2005/0062844 A1 * | 3/2005 | Ferren et al. | 348/14.08 |
| 2005/0164681 A1 * | 7/2005 | Jenkins et al. | 455/412.1 |
| 2006/0229093 A1 * | 10/2006 | Bhutiani et al. | 455/518 |
| 2007/0195735 A1 * | 8/2007 | Rosen et al. | 370/335 |
| 2007/0201376 A1 * | 8/2007 | Marshall-Wilson | 370/252 |

* cited by examiner

Primary Examiner—Pankaj Kumar
Assistant Examiner—Lonnie Sweet
(74) Attorney, Agent, or Firm—Merchant & Gould, P.C.

(57) ABSTRACT

A method for processing speech data packets passed between a plurality of devices in a conversation is disclosed. The method associates priorities with each of the devices in the conversation and processes speech data packets received from the devices according to the priorities. Devices in the conversation are identified, a priority for each device is determined, and the priority for each device is associated with speech data packets transmitted from the device. The priorities may change during the conversation. If more than one speech data packet is received in a time window, the speech data packet with high priority is transmitted. Speech data packets that are not transmitted may be deleted or buffered. If a device is not assigned a priority, a low priority is assigned to speech data packets transmitted from the device.

19 Claims, 20 Drawing Sheets

US 7,697,511 B2

SELECTIVE VOICE SWITCHING OF MULTIPARTY COMMUNICATIONS

BACKGROUND

Generally described, an Internet telephony system provides an opportunity for users to have a call connection with enhanced calling features compared to a conventional Public Switched Telephone Network (PSTN)-based telephony system. In a typical Internet telephony system, often referred to as Voice over Internet Protocol (VoIP), audio information is processed into a sequence of data blocks, called packets, for communications utilizing an Internet Protocol (IP) data network. During a VoIP call conversation, the digitized voice is converted into small frames of voice data and a voice data packet is assembled by adding an IP header to the frame of voice data that is transmitted and received.

VoIP technology has been favored because of its flexibility and portability of communications, ability to establish and control multimedia communication, and the like. VoIP technology will likely continue to gain favor because of its ability to provide enhanced calling features and advanced services which the traditional telephony technology has not been able to provide. However, current VoIP approaches may not provide a systematic way for a conversation participant, e.g., a manager, to be heard first or exclusively when more than one participant in a conversation, e.g., a conference call, speaks at the same time.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method for processing speech data packets exchanged between two or more devices that may process a conversation is provided. The method associates priorities with each of the devices in the conversation and processes the exchanged speech data packets according to the priorities.

Associating priorities with the devices comprises: identifying the devices in the conversation; determining a priority for each device; and associating a priority with each device. The priority associated with each device may change during the conversation.

Processing the speech data packets received from the devices according to the priorities comprises: receiving a first speech data packet from a first device; receiving a second speech data packet from a second device; determining priorities of the first speech data packet and the second speech data packet based on the priorities associated with the first device and the second device; transmitting the speech data packet with a highest priority; and using a predetermined policy to process the speech data packet that was not transmitted. The speech data packet that was not transmitted may be deleted or buffered. If a speech data packet is buffered, the speech data packet may be transmitted or deleted at a later time.

The method also includes processing speech data packets from devices that are not assigned a priority. If a device is not assigned a priority, a lowest priority is assigned to speech data packets transmitted from the device.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention relates to a method for processing speech data packets according to priority. Although the present invention will be described with relation to illustrative structural hierarchies and an IP telephony environment, one skilled in the relevant art will appreciate that the disclosed embodiments are illustrative in nature and should not be construed as limiting.

Figure 1:
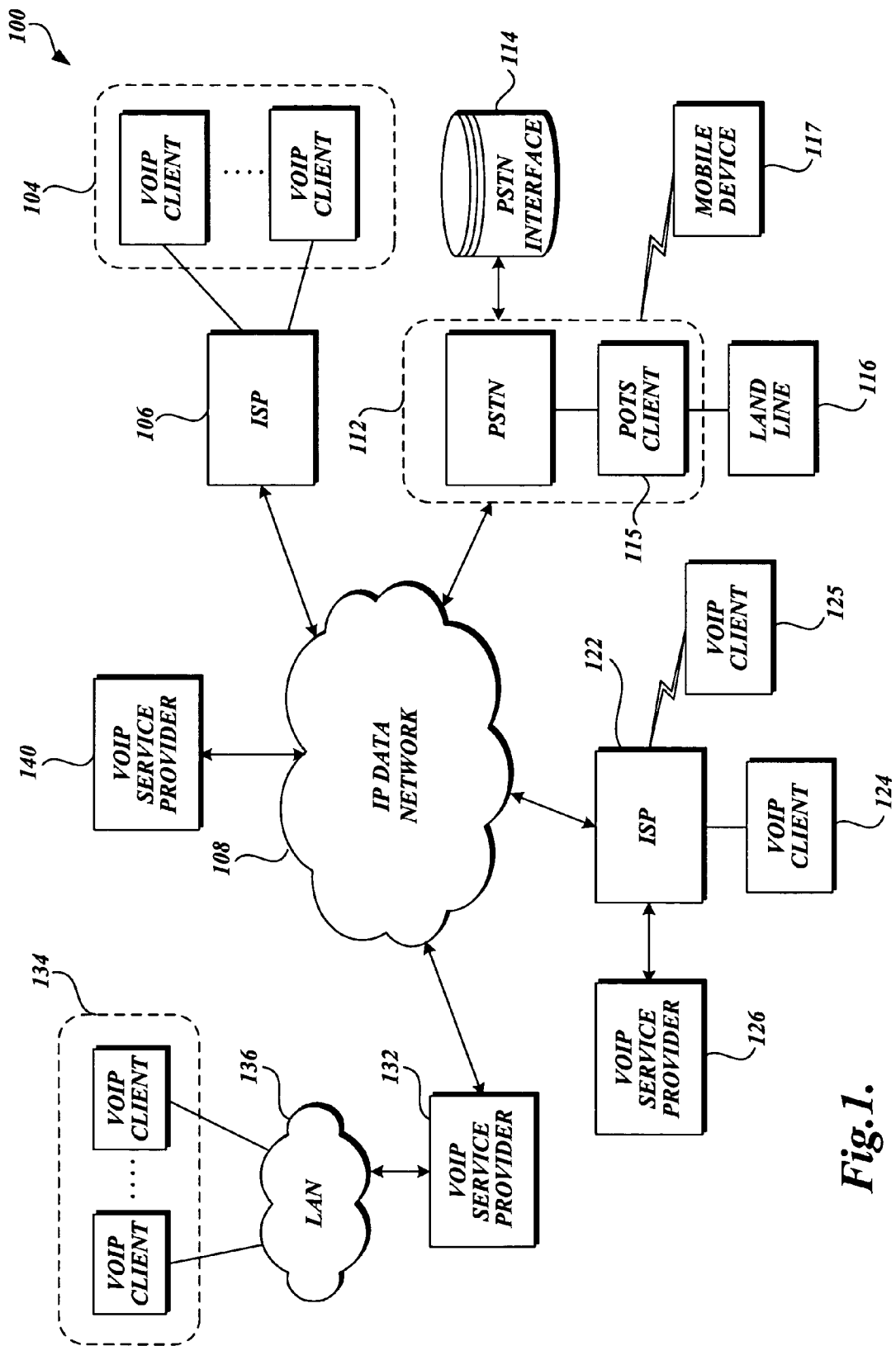
FIG. 1 is a block diagram of a VoIP environment for establishing a conversation channel between various VoIP clients.

With reference to FIG. 1, a block diagram of an IP telephony environment 100 for providing IP telephone services between various "VoIP clients" is shown. A "VoIP client," as used herein, refers to a particular contact point, such as an individual, an organization, a company, etc., one or more associated VoIP devices and a unique VoIP client identifier. For example, a single individual, five associated VoIP devices and a unique VoIP client identifier collectively make up a VoIP client. Similarly, a company including five hundred individuals and over one thousand associated VoIP devices may also be collectively referred to as a VoIP client and that VoIP client may be identified by a unique VoIP client identifier. Moreover, VoIP devices may be associated with multiple VoIP clients. For example, a computer (a VoIP device) located in a residence in which three different individuals live, each individual associated with separate VoIP clients, may be associated with each of the three VoIP clients. Regardless of the combination of devices, the unique VoIP client identifier may be used within a voice system to reach the contact point of the VoIP client.

Generally described, the IP telephony environment 100 may include an IP data network 108 such as the Internet, an intranet network, a wide area network (WAN), a local area network (LAN) and the like. The IP telephony environment 100 may further include VoIP service providers 126, 132 providing VoIP services to VoIP clients 124, 125, 134. A VoIP call conversation may be exchanged as a stream of data packets corresponding to voice information, media information, and/or contextual information. As will be discussed in greater detail below, the contextual information includes metadata (information of information) relating to the VoIP conversation, the devices being used in the conversation, the contact point of the connected VoIP clients, and/or individuals that are identified by the contact point (e.g., employees of a company).

The IP telephony environment 100 may also include third party VoIP service providers 140. The VoIP service providers 126, 132, 140 may provide various calling features, such as incoming call-filtering, text data, voice and media data integration, and the integrated data transmission as part of a VoIP call conversation. VoIP clients 104, 124, 125, 136 may create, maintain, and provide information relating to predetermined priorities for incoming calls. In addition, the VoIP service providers 126, 132, 140 may also generate, maintain, and provide a separated set of priority information (e.g., provider priority list) for individuals communicating in a call conversation. The VoIP service providers 126, 132, 140 may determined and assign an appropriate priority level to data packets based on priority information provided by VoIP clients 104, 124, 125, 136 in conjunction with the provider priority list.

VoIP service providers 132 may be coupled to a private network such as a company LAN 136, providing IP telephone services (e.g., internal calls within the private network, external calls outside of the private network, and the like) and multimedia data services to several VoIP clients 134 communicatively connected to the company LAN 136. Similarly, VoIP service providers, such as VoIP service provider 126, may be coupled to Internet Service Provider (ISP) 122, providing IP telephone services and VoIP services for clients of the ISP 122.

In one embodiment, one or more ISPs 106, 122 may be configured to provide Internet access to VoIP clients 104, 124, 125 so that the VoIP clients 104, 124, 125 can maintain conversation channels established over the Internet. The VoIP clients 104, 124, 125 connected to the ISP 106, 122 may use wired and/or wireless communication lines. Further, each VoIP client 104, 124, 125, 134 can communicate with Plain Old Telephone Service (POTS) 115 communicatively connected to a PSTN 112. A PSTN interface 114 such as a PSTN gateway may provide access between PSTN and the IP data network 108. The PSTN interface 114 may translate VoIP data packets into circuit switched voice traffic for PSTN and vice versa. The PSTN 112 may include a land line device 116, a mobile device 117, and the like.

Conventional voice devices, such as land line 116 may request a connection with the VoIP client based on the unique VoIP identifier of that client and the appropriate VoIP device associated with the VoIP client, will be used to establish a connection. In one example, an individual associated with the VoIP client may specify which devices are to be used in connecting a call based on a variety of conditions (e.g., connection based on the calling party, the time of day, etc.).

It is understood that the above mentioned configuration in the environment 100 is merely exemplary. It will be appreciated by one of ordinary skill in the art that any suitable configurations with various VoIP entities can be part of the environment 100. For example, VoIP clients 134 coupled to LAN 136 may be able to communicate with other VoIP clients 104, 124, 125, 134 with or without VoIP service providers 132 or ISP 106, 122. Further, an ISP 106, 122 can also provide VoIP services to its client.

Figure 2:
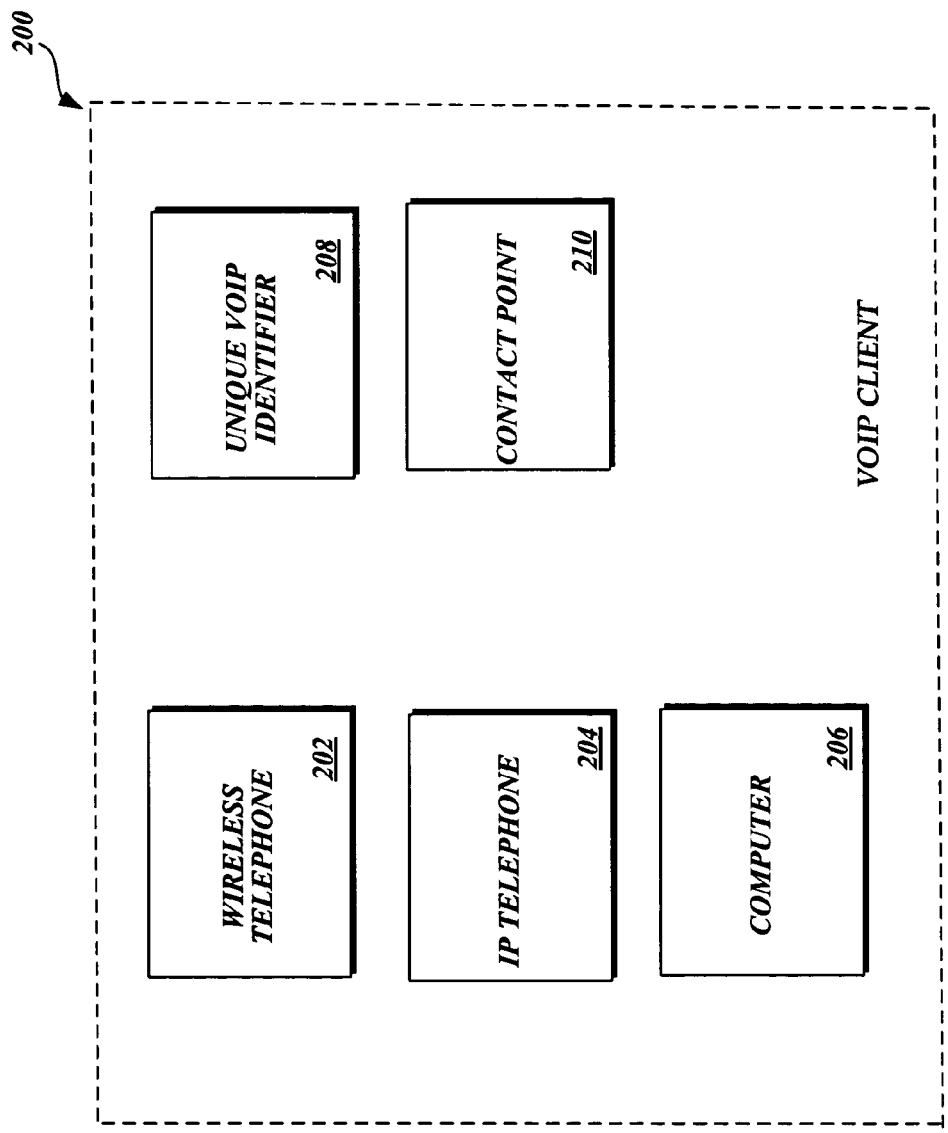
FIG. 2 is a block diagram of a VoIP client.

Referring now to FIG. 2, a block diagram illustrating an exemplary VoIP client 200 that includes several VoIP devices and a unique VoIP identifier, in accordance with an embodiment of the present invention, is shown. Each VoIP device 202, 204, 206 may include a storage that is used to maintain voice messages, address books, client specified rules, priority information related to incoming calls, etc. Alternatively, or in addition thereto, a separate storage, maintained for example by a service provider, may be associated with the VoIP client and accessible by each VoIP device that contains information relating to the VoIP client. In an embodiment, any suitable VoIP device such as a wireless phone 202, an IP phone 204, or a computer 206 with proper VoIP applications may be part of the VoIP client 200. The VoIP client 200 also maintains a one or more unique VoIP identifier 208. The unique VoIP identifier(s) 208 may be constant or change over time. For example, the unique identifier(s) 208 may change with each call. The unique VoIP identifier is used to identify the client and to connect with the contact point 210 associated with the VoIP client. The unique VoIP identifier may be maintained on each VoIP device included in the VoIP client and/or maintained by a service provider that includes an association with each VoIP device included in the VoIP client. In the instance in which the unique VoIP identifier is maintained by a service provider, the service provider may include information about each associated VoIP device and knowledge as to which device(s) to connect for incoming communications. In alternative embodiment, the VoIP client 200 may maintain multiple VoIP identifiers. In this embodiment, a unique VoIP identifier may be temporarily assigned to the VoIP client 200 for each call session.

The unique VoIP identifier may be used similar to a telephone number in PSTN. However, instead of dialing a typical telephone number to ring a specific PSTN device, such as a home phone, the unique VoIP identifier is used to reach a contact point, such as an individual or company, which is associated with the VoIP client. Based on the arrangement of the client, the appropriate device(s) will be connected to reach the contact point. In one embodiment, each VoIP device included in the VoIP client may also have its own physical address in the network or a unique device number. For example, if an individual makes a phone call to a POTS client using a personal computer (VoIP device), the VoIP client identification number in conjunction with an IP address of the personal computer will eventually be converted into a telephone number recognizable in PSTN.

Figure 3:
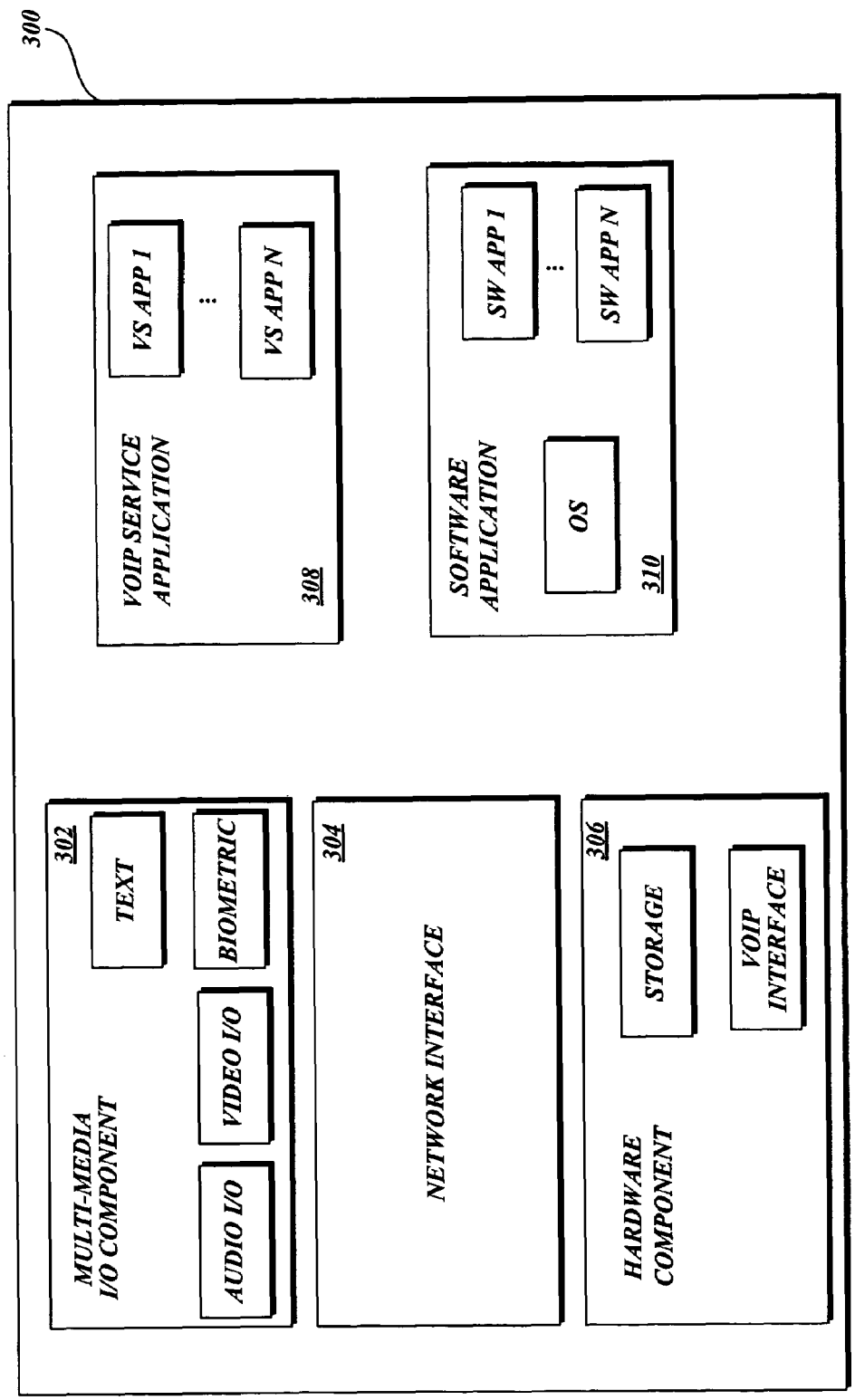
FIG. 3 is a block diagram of various components associated with a VoIP device.

FIG. 3 is a block diagram of a VoIP device 300 that may be associated with one or more VoIP clients and used with embodiments of the present invention. It is to be noted that the VoIP device 300 is described as an example. It will be appreciated that any suitable device with various other components can be used with embodiments of the present invention. For utilizing VoIP services, the VoIP device 300 may include components suitable for receiving, transmitting and processing various types of data packets. For example, the VoIP device 300 may include a multimedia input/output component 302 and a network interface component 304. The multimedia input/output component 302 may be configured to input and/or output multimedia data (including audio, video, and the like), user biometrics, text, application file data, etc. The multimedia input/output component 302 may include any suitable user input/output components such as a microphone, a video camera, a display screen, a keyboard, user biometric recognition devices and the like. The multimedia input/output component 302 may also receive and transmit multimedia data via the network interface component 304. The network interface component 304 may support interfaces such as Ethernet interfaces, frame relay interfaces, cable interfaces, DSL interfaces, token ring interfaces, radio frequency (air interfaces), and the like. The VoIP device 300 may comprise a hardware component 306 including permanent and/or non-transitory removable storage such as read-only memory devices (ROM), random access memory (RAM), hard drives, optical drives, and the like. The storage may be configured to store program instructions for controlling the operation of an operating system and/or one or more applications and to store contextual information related to individuals (e.g., voice profiles, user biometrics information, etc) associated with the VoIP client in which the device is included. In one embodiment, the hardware component 306 may include a VoIP interface card which allows non-VoIP client device to transmit and receive a VoIP conversation.

The device 300 may further include a software application component 310 for the operation of the device 300 and a VoIP Service application component 308 for supporting various VoIP services. The VoIP service application component 308 may include applications such as data packet assembler/disassembler applications, a structured hierarchy parsing application, audio Coder/Decoder (CODEC), video CODEC and other suitable applications for providing VoIP services. The CODEC may use voice profiles to filter and improve incoming audio.

Figure 4A:
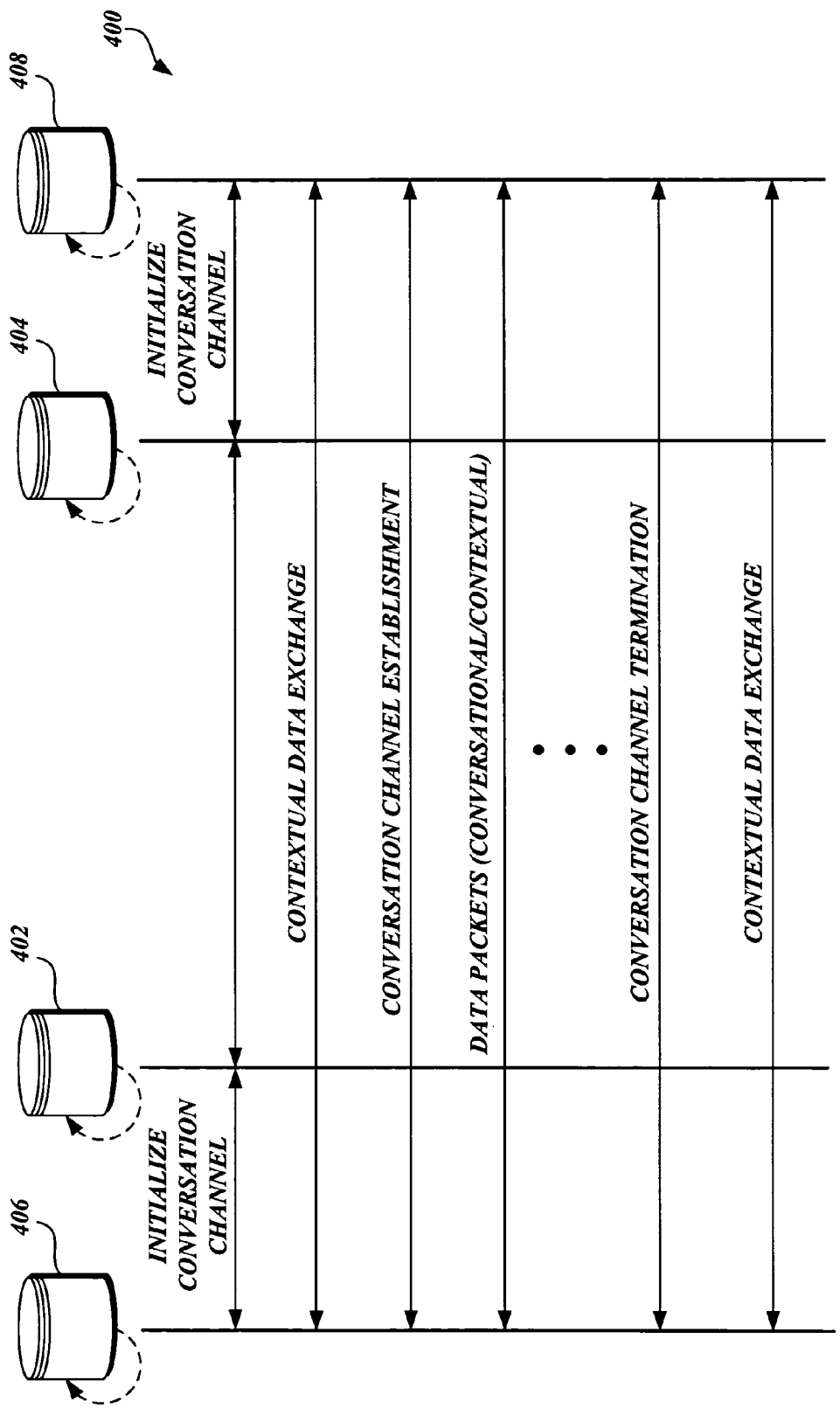
FIGS. 4A and 4B are block diagrams of the exchange of data between two VoIP clients over a conversation channel.

With reference to FIG. 4A, a block diagram illustrative of a conversation flow 400 between VoIP devices of two different VoIP clients over a conversation channel, in accordance with an embodiment of the present invention, is shown. During a connection set-up phase, a VoIP device of a first VoIP client 406 requests to initiate a conversation channel with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 406. While this example utilizes two VoIP service providers and two VoIP clients, any number and combination of VoIP clients and/or service providers may be used with embodiments of the present invention. For example, only one service provider may be utilized in establishing the connection. In yet another example, communication between VoIP devices may be direct, utilizing public and private lines, thereby eliminating the need for a VoIP service provider. In a peer to peer context, communication between VoIP devices may also be direct without having any service providers involved.

There are a variety of protocols that may be selected for use in exchanging information between VoIP clients, VoIP devices, and/or VoIP service providers. For example, when Session Initiation Protocol (SIP) is selected for a signaling protocol, session control information and messages will be exchanged over a SIP signaling path/channel and media streams will be exchanged over Real-Time Transport Protocol (RTP) path/channel. For the purpose of discussion, a communication channel, as used herein, generally refers to any type of data or signal exchange path/channel. Thus, it will be appreciated that depending on the protocol, a connection set-up phase and a connection termination phase may require additional steps in the conversation flow 400.

For ease of explanation, we will utilize the example in which both the first VoIP client 406 and the second VoIP client 408 each only includes one VoIP device. Accordingly, the discussion provided herein will refer to connection of the two VoIP devices. The individual using the device of the first VoIP client 406 may select or enter the unique VoIP identifier of the client that is to be called. Provider 1 402 receives the request from the device of the first VoIP client 408 and determines a terminating service provider (e.g., Provider 2 404 of the second VoIP client 408) based on the unique VoIP identifier included in the request. The request is then forwarded to Provider 2 404. This call initiation will be forwarded to the device of the second VoIP client. A conversation channel between the device of the first VoIP client 406 and a device of the second VoIP client 408 can then be established.

In an illustrative embodiment, before the devices of the first VoIP client 406 and the second VoIP client 408 begin to exchange data packets, contextual information may be exchanged. As will be discussed in a greater detail below, the contextual information may be packetized in accordance with a predefined structure that is associated with the conversation. Any device associated with the first VoIP client 406, the service provider of the first VoIP client 406, or a different device/service provider may determine the structure based on the content of the contextual information. In one embodiment, the exchanged contextual information may include information relating to the calling VoIP client 406, the device, and the VoIP client 408 being called. For example, the contextual information sent from the called VoIP client 406 may include priority list of incoming calls from various potential calling VoIP clients including VoIP client 406.

Available media types, rules of the calling client and the client being called, and the like, may also be part of the contextual information that is exchanged during the connection set-up phase. The contextual information may be processed and collected by one the devices of the first VoIP client 406, one of the devices of the second VoIP client 408, and/or by VoIP service providers (e.g., Provider 1 402 and Provider 2 404), depending on the nature of the contextual information. In one embodiment, the VoIP service providers 402, 404 may add/or delete some information to/from the client's contextual information before forwarding the contextual information. In response to a request to initiate a conversation channel, the second VoIP client 408 may accept the request for establishing a conversation channel or execute other appropriate actions such as rejecting the request via Provider 2 404. The appropriate actions may be determined based on the obtained contextual information. When a conversation channel is established, a device of the first VoIP client 406 and a device of the second VoIP client 408 start communicating with each other by exchanging data packets. As will be described in greater detail, the data packets, including conversation data packets and contextual data packets, are communicated over the established conversation channel between the connected devices.

Conversation data packets carry data related to a conversation, for example, a voice data packet, or multimedia data packet. Contextual data packets carry information relating to data other than the conversation data. Once the conversation channel is established, either the first VoIP client 406 or the second VoIP client 408 can request to terminate the conversation channel. Some contextual information may be exchanged between the first VoIP client 406 and the second VoIP client 408 after the termination.

Figure 4B:
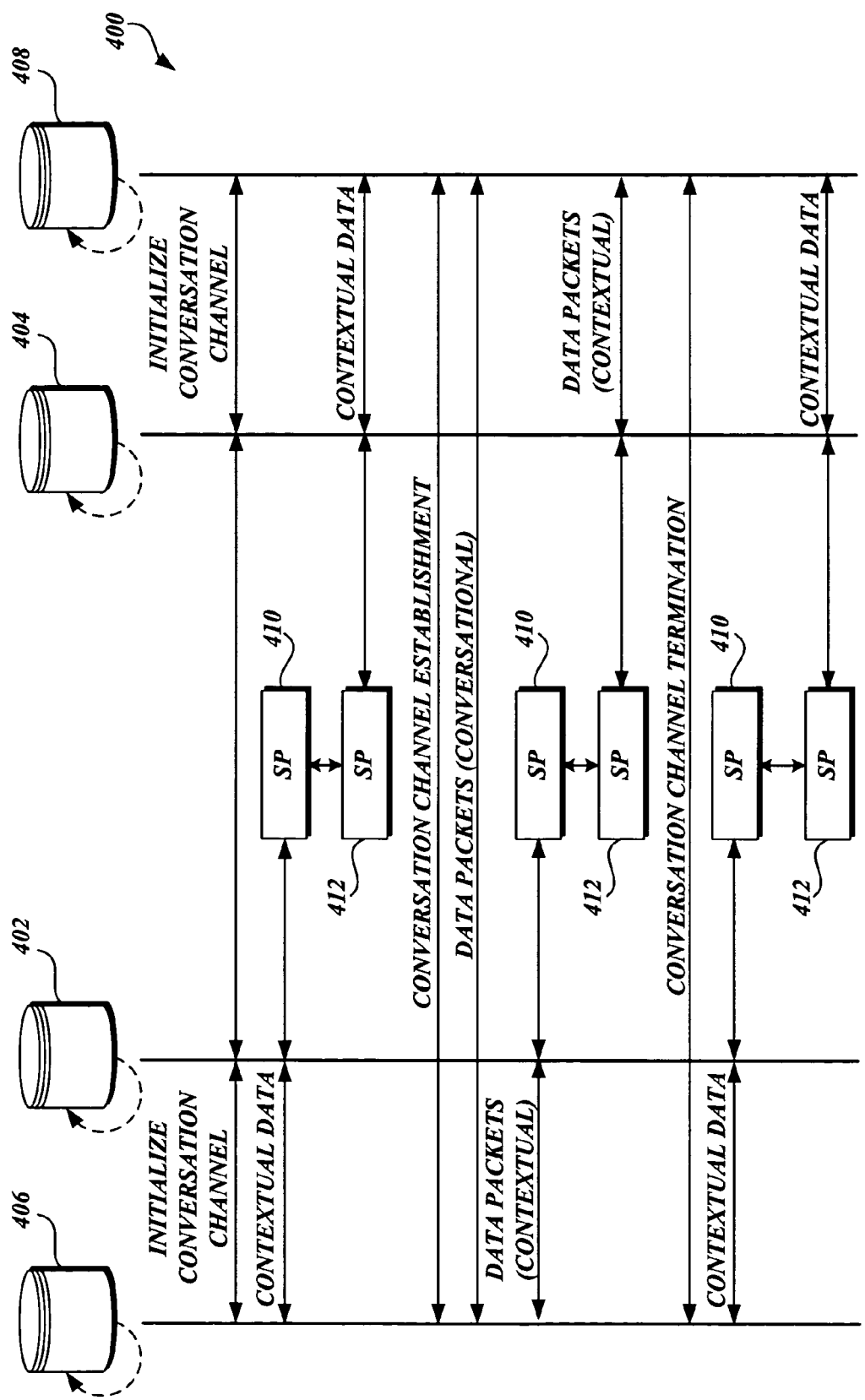

FIG. 4B is a block diagram illustrative of a conversation flow 400 between devices of two VoIP clients via several service providers, in accordance with an embodiment of the present invention. As with FIG. 4A, the example described herein will utilize the scenario in which each client only has one device associated therewith and the connection occurs between those two devices. During a connection set-up phase, a device of a first VoIP client 406 requests to initiate a conversation channel for communication with a second VoIP client 408. In an illustrative embodiment, a VoIP service provider 402 (Provider1) for the first VoIP client 406 receives the request to initiate a conversation channel and forwards the request to a VoIP service provider 404 (Provider2) for the second VoIP client 408.

Before the device of the first VoIP client 406 and the device of the second VoIP client 408 begin to exchange voice data packets, contextual information may be exchanged between the first VoIP client 406 and the second VoIP client 408. Contextual information may be exchanged using a structured organization defined by the first VoIP client 406. In one embodiment, Provider 1 402 may identify particular contextual information which Provider 1 402 desires to obtain from the first VoIP client 406. The first VoIP client 406 may specify the corresponding structure based on the content of the contextual information. The identification of the structure for exchanging information and additional contextual information may be transmitted to the second VoIP client 408 via Provider 2 404 and Provider 1 402.

The contextual information may be processed and collected at a device of the first VoIP client, a device of the second VoIP client, and/or the VoIP service providers (e.g., Provider1 and Provider2), depending on the nature of the contextual information. For example, voice profiles may be collected by the service providers 402, 404, and only temporarily provided to the devices. Further, third party Service Provider(s) (third party SP) 410, 412 can obtain and/or add contextual information exchanged among devices of the first VoIP client 406 and second VoIP client 408, Provider 1 402, and Provider 2 404. In one embodiment, any of Provider 1 402, Provider 2 404, and third party SP 410, 412 may add, modify and/or delete contextual information before forwarding the contextual information to the next VoIP device(s), including other service providers.

In response to a request to initiate a conversation channel, the second VoIP client 408 may accept the request for establishing a conversation channel or reject the request via Provider 2 404. When a conversation channel has been established, the devices of the first VoIP client 406 and the second VoIP client 408 start communicating with each other by exchanging data packets as discussed above. In one embodiment, contextual and/or conversation data packets may be forwarded to third party SPs 410, 412 from Provider 1 402, Provider 2 404, or from either VoIP client 406, 408. Further, the forwarded contextual and/or conversation data packets may be exchanged among various third party SPs 410, 412.

Figure 5:
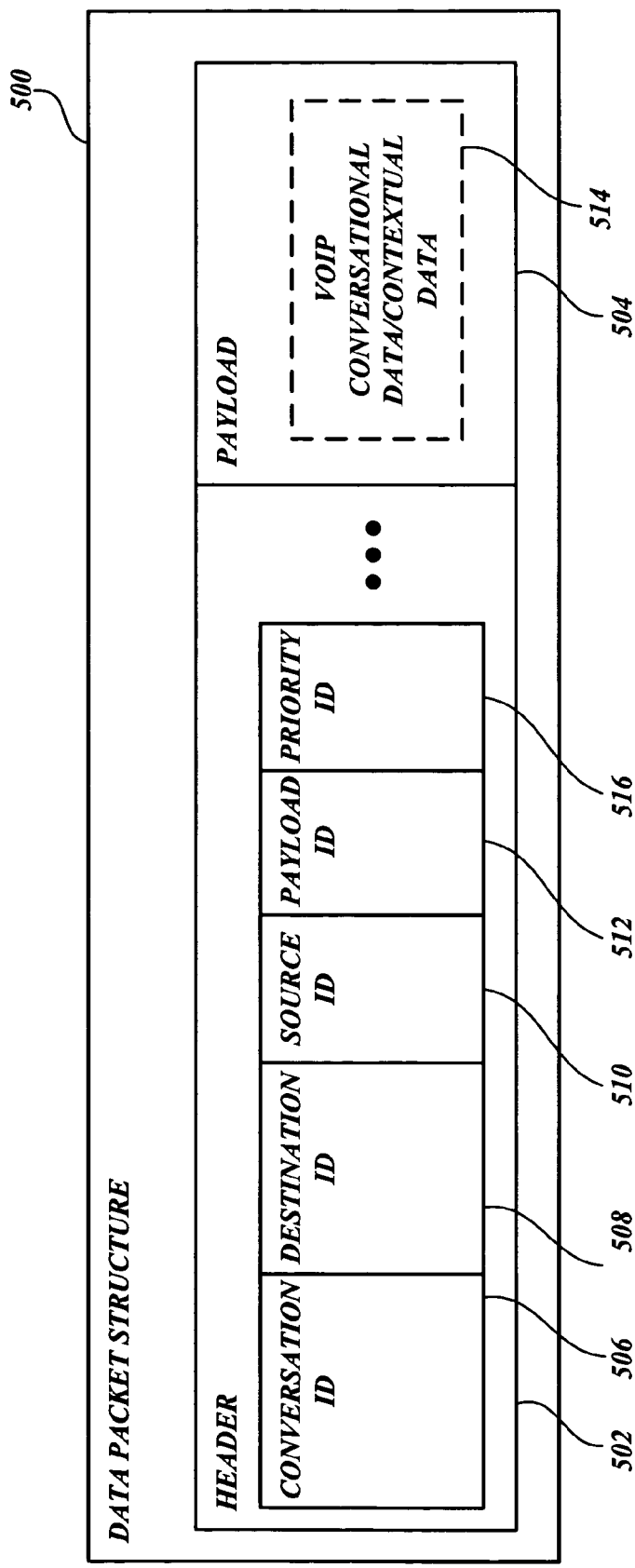
FIG. 5 is a block diagram of a data packet used over a communication channel established in the VoIP environment of FIG. 1.

FIG. 5 is a block diagram of a data packet structure 500 used over a communication (conversation) channel in accordance with an embodiment of the present invention. The data packet structure 500 may be a data packet structure for an IP data packet suitable for being utilized to carry conversation data (e.g., voice, multimedia data, and the like) or contextual data (e.g., information relating to the VoIP services, and the like). However, any other suitable data structure can be utilized to carry conversation data or contextual data. The data packet structure 500 includes a header 502 and a payload 504. The header 502 may contain information necessary to deliver the corresponding data packet to a destination. Additionally, the header 502 may include information utilized in the process of a conversation. Such information may include conversation ID 506 for identifying a conversation (e.g., call), a Destination ID 508, such as a unique VoIP identifier of the client being called, a Source ID 510 (unique VoIP identifier of the calling client or device identifier), Payload ID 512 for identifying type of payload (e.g., conversation or contextual), Priority ID 516 for identifying packet priority, individual ID (not shown) for identifying the individual for which the conversation data is related, and the like. In an alternative embodiment, the header 502 may contain information regarding Internet protocol versions, and payload length, among others. The payload 504 may include VoIP conversational data or contextual data 514 relating to an identified conversation. As will be appreciated by one of ordinary skill in the art, additional headers may be used for upper layer headers such as a TCP header, a UDP header, and the like.

In one embodiment of the present invention, a structured hierarchy may be predefined for communicating contextual information over a VoIP conversation channel. The contextual information may include any information relating to VoIP clients, VoIP devices, conversation channel connections (e.g., call basics), conversation context (e.g., call context) and the like. More specifically, the contextual information may include client preference, client rules, client's location (e.g., user location, device location, etc.), biometrics information, the client's confidential information, VoIP device's functionality, VoIP service providers information, media type, media parameters, calling number priority, keywords, information relating to application files, and the like. The contextual information may be processed and collected at each VoIP client and/or the VoIP service providers depending on the nature of the contextual data. In one aspect, the VoIP service providers may add, modify and/or delete VoIP client's contextual data before forwarding the contextual information. For example, client's confidential information will be deleted by the VoIP service provider associated with that client unless the client authorizes such information to be transmitted. In some cases, a minimal amount of contextual information is transmitted outside of an intranet network.

Figure 6:
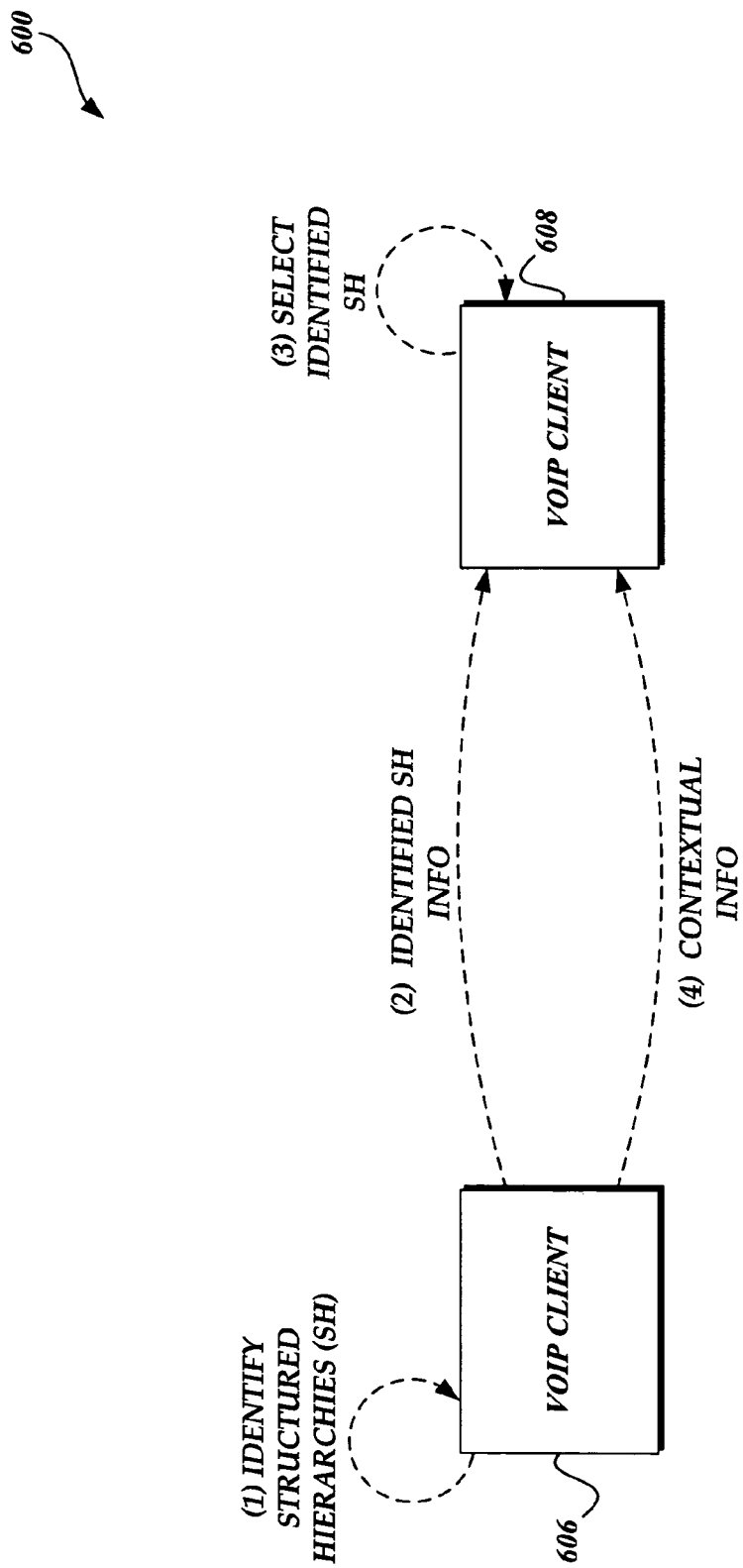
FIG. 6 is a block diagram illustrating interactions between VoIP devices of two VoIP clients for transferring contextual information defined by identified structured hierarchies.

With reference to FIG. 6, a block diagram 600 illustrating interactions between two VoIP clients for transferring contextual information, in accordance with an embodiment of the present invention, is shown. As with FIGS. 4A and 4B, the example described herein will utilize the scenario in which each client only has one device associated therewith and the connection occurs between those two devices. In one embodiment, devices of VoIP Client 606 and VoIP Client 608 have established a VoIP conversation channel. It may be identified which structured hierarchies will be used to carry certain contextual information by VoIP Client 606. The information regarding the identified structured hierarchies may include information about which structured hierarchies are used to carry the contextual information, how to identify the structured hierarchy, and the like. Such information will be exchanged between VoIP Client 606 and VoIP Client 608 before the corresponding contextual information is exchanged. Upon receipt of the information about which structured hierarchy is used to carry the contextual information, VoIP Client 608 looks up predefined structured hierarchies (e.g., XML namespace and the like) to select the identified structured hierarchies. In one embodiment, the predefined structured hierarchies can be globally stored and managed in a centralized location accessible from a group of VoIP clients. In this embodiment, a Uniform Resource Identifier (URI) address of the centralized location may be transmitted from VoIP Client 606 to VoIP Client 608.

In another embodiment, each VoIP client may have a set of predefined structured hierarchies stored in a local storage of any devices or a dedicated local storage which all devices can share. For example, devices may be assigned priorities and the assigned priorities may be stored in a dedicated local storage which all devices can share. If there is a temporal conflict between data packets transmitted by two devices, i.e., the packets arrive at the same time, the assigned priorities may be used to help resolve the temporal conflict. The predefined structured hierarchies may be declared and agreed upon between VoIP clients before contextual information is exchanged. In this manner, the need to provide the structure of the contextual data packets may be eliminated and thus the amount of transmitted data packets corresponding to the contextual data is reduced. Further, by employing the predefined structured hierarchies, data packets can be transmitted in a manner which is independent of hardware and/or software.

Upon retrieving the identified structured hierarchy, VoIP Client 608 is expecting to receive a data stream such that data packets corresponding to the data stream are defined according to the identified structured hierarchies. VoIP Client 606 can begin sending contextual information represented in accordance with the identified structured hierarchies. In one embodiment, VoIP Client 608 starts a data binding process with respect to the contextual information. For example, instances of the identified structured hierarchies may be constructed with the received contextual information.

Figure 7A:
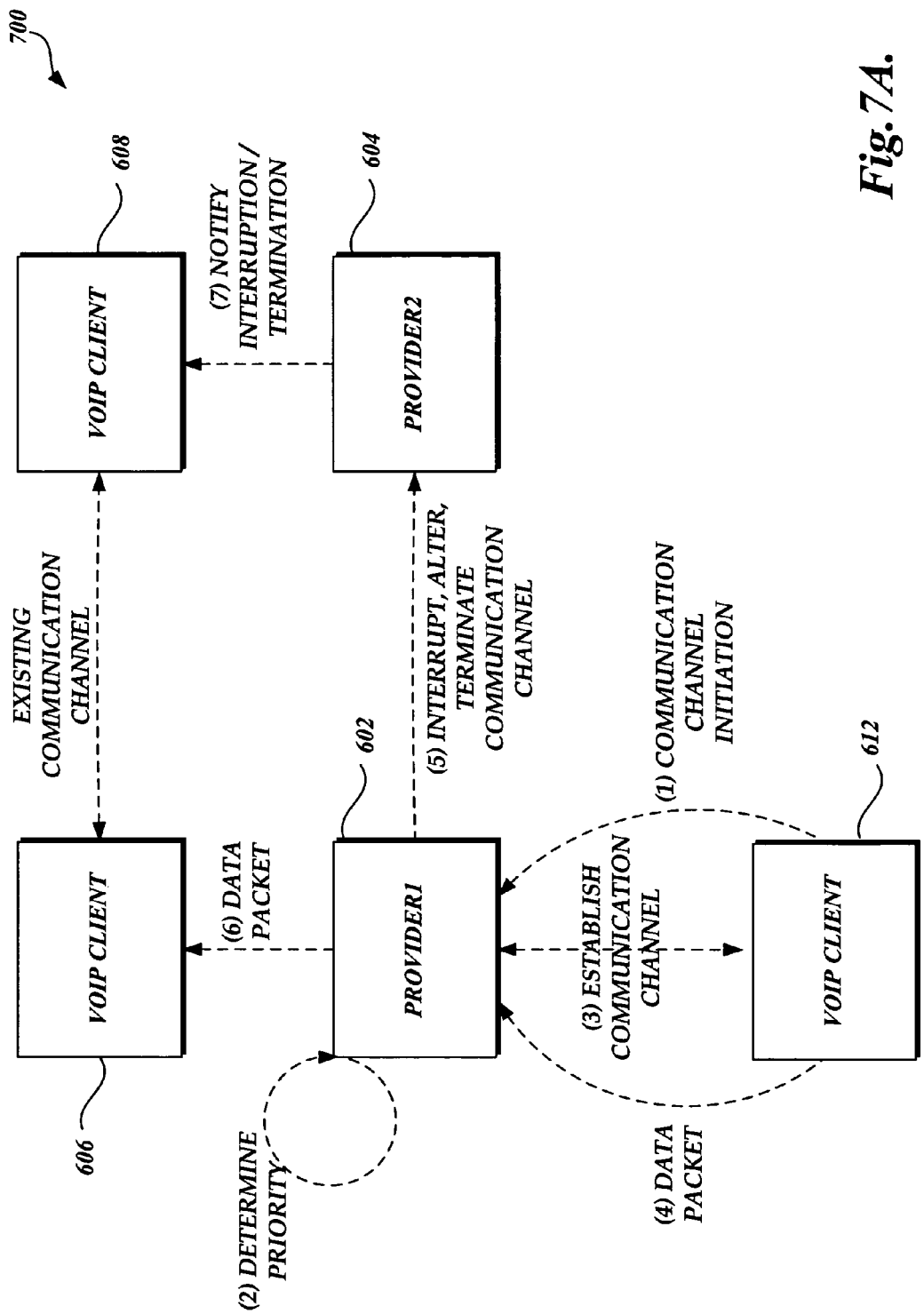
FIGS. 7A-7C are block diagrams of interactions among VoIP entities in the VoIP environment utilizing data packet prioritization.
Figure 7B:
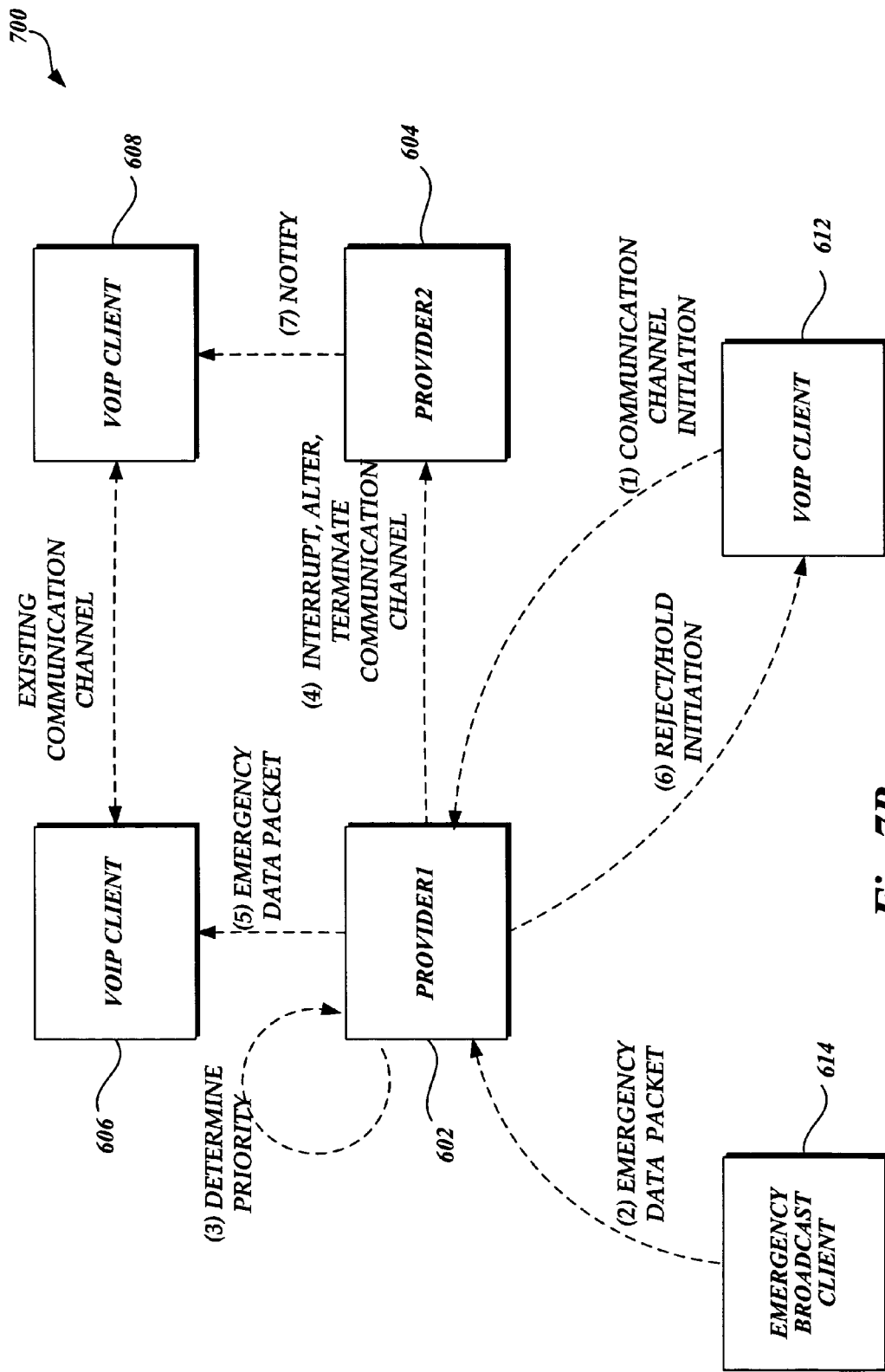
Figure 7C:
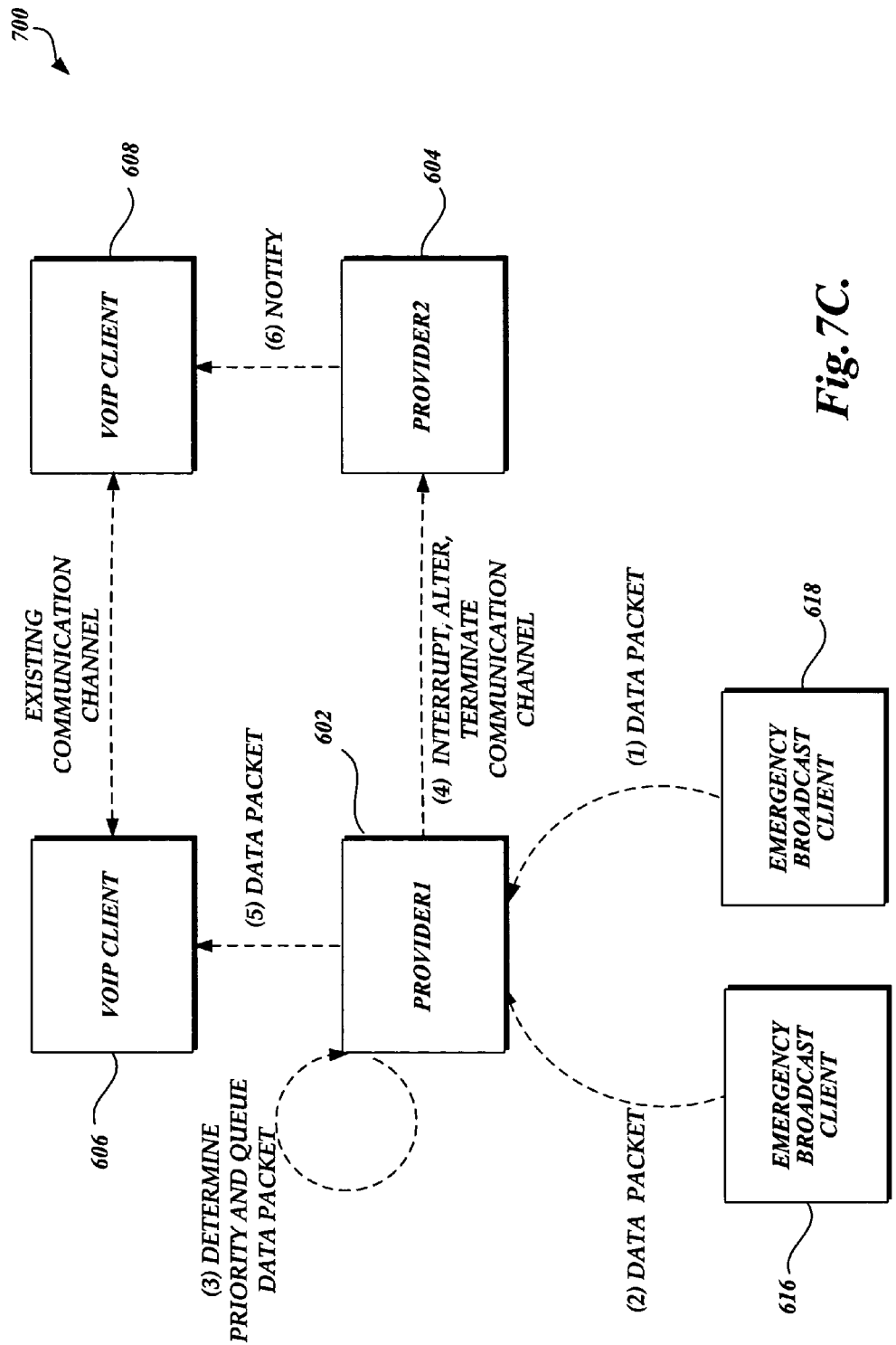
Figure 8:
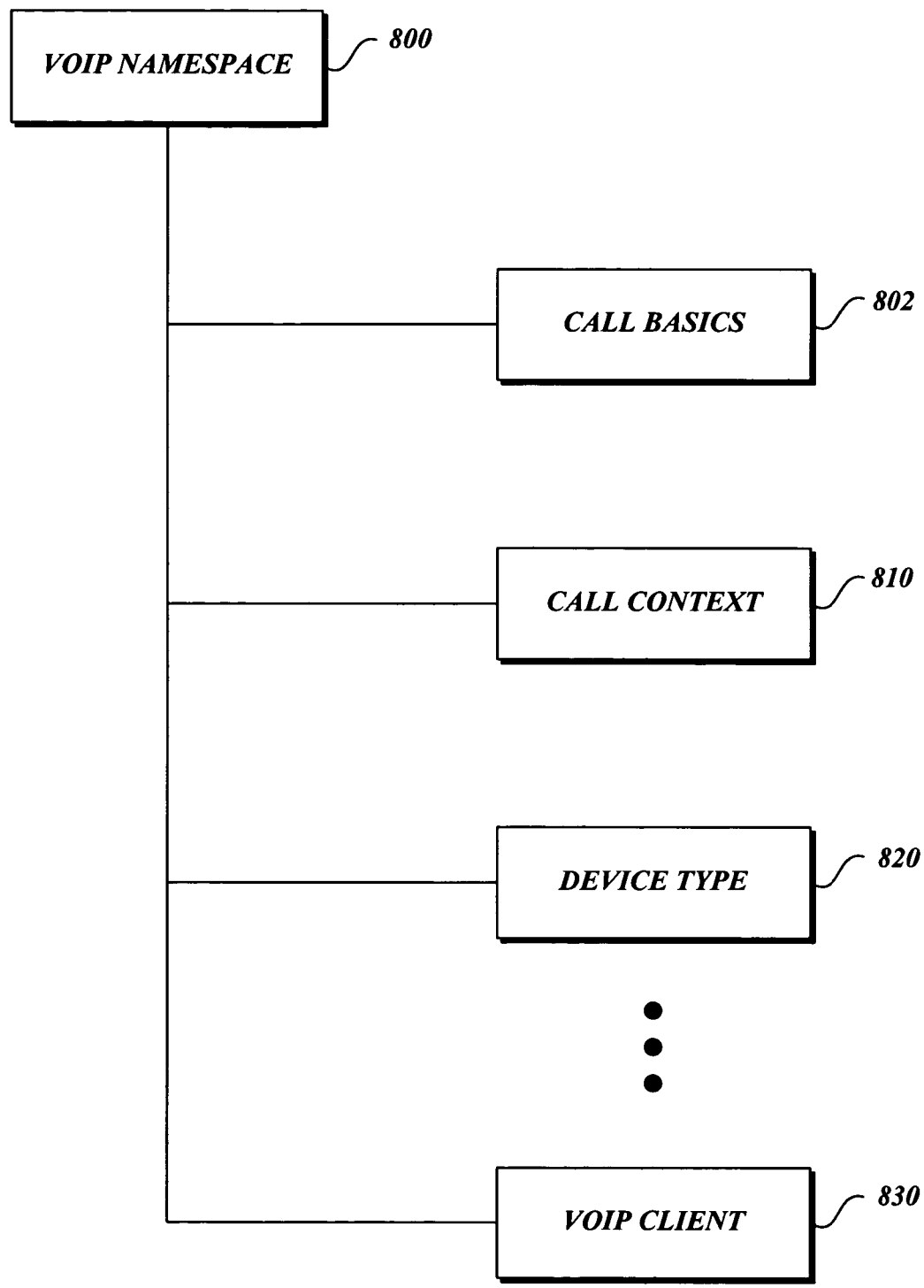
FIGS. 8-12 are block diagrams illustrating various attribute and classes of structured hierarchies corresponding to VoIP contextual information.

FIGS. 7A-7C are block diagrams 700 illustrating interactions among VoIP entities in the VoIP environment utilizing data packet prioritization in accordance with an aspect of the present invention. In one embodiment, the VoIP entities may include VoIP clients, VoIP service providers for the clients, third party service providers and the like. It is to be noted that one of ordinary skill in the relevant art will appreciate that any suitable entities may be included in the IP telephone environment.

With reference to FIG. 7A, in one embodiment, VoIP Client 606 may already have an existing communication channel with VoIP Client 608. While this example utilizes two VoIP service provides and two VoIP clients, any number and combination of VoIP clients and/or service providers may be used with embodiments of the present invention. A service provider of VoIP Client 606, Provider 1 602 has already obtained contextual information including priority information from VoIP Client 606. As will be described in greater detail below, it is contemplated that structured hierarchies are utilized to carry contextual information (contextual data packets) between several VoIP entities in this illustrative embodiment. In the embodiment, Provider 1 602 may receive a request from VoIP Client 612 to initiate a communication channel between devices of VoIP Client 612 and VoIP Client 606. Provider 1 602 may determine priority levels of VoIP Client 608 and VoIP Client 612 based on the priority information obtained from VoIP Client 606. In one embodiment, contextual information corresponding to the priority information may include a predefined priority level for each potential VoIP client that may call VoIP Client 606. Alternatively, a predefined priority level can be specified based on a membership associated with a particular group of potential callers, or the VoIP client associated with the caller. In this example, if a potential caller is identified as a member of a particular group (e.g., a family, a customer, an emergency, a project team, etc), a priority level of the particular group will be assigned to the potential caller.

If Provider 1 602 determines that VoIP Client 612 has higher priority than VoIP Client 608, Provider 1 602 accepts the request to initiate a communication channel between VoIP Client 612 and VoIP Client 606. The communication channel is established between VoIP Client 612 and VoIP Client 606. VoIP Client 612 starts sending data packets to Provider 1 602 over the established communication channel. In one embodiment, Provider 1 602 may terminate, interrupt, or alter the existing communication channel between VoIP Client 606 and VoIP Client 608. Upon termination of the existing communication channel, Provider 2 604 may notify VoIP Client 608 of the termination. In an alternative embodiment, Provider 1 602 may interrupt the existing communication channel by putting on hold data packets transmitted from VoIP Client 608. Upon interruption of the existing communication channel, Provider 2 604 may notify VoIP Client 608 of the interruption. As will be appreciated by one of ordinary skill in the art, VoIP Client 608 can terminate the communication channel any time during the interruption. After the communication channel between VoIP Client 606 and VoIP Client 608 has been terminated or interrupted, VoIP Client 606 and VoIP Client 612 can exchange data packets between each other over the newly established communication channel. Provider 1 602 may transmit the data packets received from VoIP Client 612 to the VoIP Client 606. It is contemplated that an authorized VoIP client or device can force a change in priority levels of data packets even after the priority levels have been determined. Such a change may occur at any time (e.g., before, during, and/or after a conversation). It is also contemplated that the priority levels of data packets can be dynamically evaluated and altered based on contextual information received from VoIP clients, service providers, or other VoIP entities.

In one embodiment, priority levels of data packets may be determined based on numerous kinds of information including priority of sending client, size and type (e.g., multimedia, text, audio, application file, and the like) of data packets, callee preferences and the like. In an illustrative embodiment, Provider 1 602 may determine the priority level of data packets based on the type of data packets when it is not able to compare the priority levels of VoIP Client 612 and VoIP Client 608. For example, VoIP Client 612 and VoIP Client 608 have the same level of priority. Provider 1 602 may assign priorities such that data packets requiring real-time data transfer have a higher priority than others. Similarly, Provider 1 602 may consider the size of the contextual information. Data packets relating to contextual information which have a small amount of information may have higher priority than others.

With reference to FIG. 7B, in another illustrative embodiment, a device of VoIP Client 606 may already have an existing communication channel with VoIP Client 608. Provider 1 602 may receive a request from VoIP Client 612 to initiate a new communication channel with VoIP Client 606. At approximately the same time, Provider 1 602 may receive an emergency data packet from Emergency Broadcast (EB) Client 614. (e.g., emergency broadcasting message to VoIP clients in certain geographic areas). It is contemplated that EB Client 614 may include any client with an authority to broadcast emergency data packets via its associated one or more providers. In this embodiment, Provider 1 602 may provide VoIP services to both VoIP Client 612 and EB Client 614. In order to decide which data packet is to be transmitted to VoIP Client 606, Provider 1 602 determines priority levels of VoIP Client 608, VoIP Client 612 and EB Client 614 based on the priority information obtained from VoIP Client 606. In one embodiment, the priority information may include a predefined priority level for each potential caller for the VoIP Client 606, a predefined priority level for a group of potential callers, or the like.

In an illustrative embodiment, VoIP Client 606 may have specified a higher priority level to EB Client 614 than VoIP Client 612 or VoIP Client 608. In this embodiment, Provider 1 602 may terminate, interrupt, or alter the existing communication channel in order to transmit EB data packets. Upon termination of the existing communication channel, Provider 2 604 may notify VoIP Client 608 of the termination. However, based on the client preference information of VoIP Client 606, Provider 1 602 may interrupt the existing communication channel by putting on hold data packets from VoIP Client 608. Upon interruption of the existing communication channel, Provider 2 604 may notify VoIP Client 608 of the interruption. VoIP Client 608 can terminate the existing communication channel any time during the interruption. Provider 1 602 rejects the request from VoIP Client 612 to initiate a communication channel.

After terminating, interrupting, or altering the communication channel between VoIP Client 606 and VoIP Client 608, Provider 1 602 may transmit the emergency data packets received from EB Client 614 to the VoIP Client 608. Generally, a typical two-way communication channel may not be necessary for emergency broadcasting and thus VoIP Client 606 can receive incoming data packets from EB Client 614 but not be able to send outgoing data packets to EB Client 614.

With reference to FIG. 7C, in one embodiment, a device of VoIP Client 606 may already have an existing communication channel with VoIP Client 608. Provider 1 602 may receive emergency data packets from one or more EB clients 616, 618. In this embodiment, Provider 1 602 may receive a first set of emergency data packets from EB Client 616 and a second set of emergency data packets from EB Client 618. Provider 1 602 may determine priority levels of EB Client 616 and EB Client 618 based on the priority information obtained from VoIP Client 606, or based on a predefined priority information for EB clients. In one embodiment, contextual information corresponding to the priority information may be exchanged to provide information relating to a predefined priority level for each potential caller for VoIP Client 606, a predefined priority level for a group of potential callers, or the like.

In one embodiment, VoIP Client 606 may have specified a predefined priority level for a group of potential callers. For example, VoIP Client 606 may have assigned the highest priority level to a group of EBs, the second highest priority level to Family members, the third highest level to Friends and so on. Although EBs have the highest priority, individual EBs (e.g., EB Client 616 and EB Client 618) can not be compared since they may have the same level of priority. In this embodiment, Proivder1 may maintain a provider priority list for emergency clients and determine the priority level for EB Client 616 and EB Client 618 based on the provider priority list in conjunction with the priority information provided from VoIP Client 606.

For the purpose of discussion, assume that Provider 1 602 may determine that EB Client 616 has a higher priority than EB Client 618. As explained above, Provider 1 602 may terminate, interrupt, or alter the existing communication channel between VoIP Client 606 and VoIP Client 608. Upon termination of the existing communication channel, Provider 2 604 may notify VoIP Client 608 of the termination. Likewise, upon interruption of the existing communication channel, Provider 2 604 may notify VoIP Client 608 of the interruption. VoIP Client 608 can terminate the communication channel any time during the interruption. After terminating or interrupting the existing communication channel between VoIP Client 606 and VoIP Client 608, Provider 1 602 may transmit the emergency data packets transmitted from EB Client 616 to VoIP Client 606. As will be appreciated by one of ordinary skill in the art, a typical two-way communication channel may not be necessary for emergency broadcasting and thus VoIP Client 606 may receive incoming data packets from EB Client 614 but not be able to send outgoing data packets. In an alternative embodiment, Provider 1 602 may store data packets transmitted from EB Client 618 in a storage area such as a buffer and the like. The stored emergency data packets may be transmitted after data packets from EB Client 616 have been transmitted.

As mentioned above, structured hierarchies may be identified for communicating contextual information corresponding to called VoIP client's priority information. Further, the information regarding the identified structured hierarchies may be transmitted. The information regarding the identified structured hierarchies may include the information about which structured hierarchies carry the contextual information, how to identify the structured hierarchies, and the like. Subsequently, the contextual information corresponding to priority information may be represented in accordance with the identified structured hierarchies and transmitted.

In one embodiment, the structured hierarchies may be defined by Extensible Markup Language (XML). However, it is to be appreciated that the structured hierarchies can be defined by any language suitable for implementing and maintaining extensible structured hierarchies. Generally described, XML is well known for a cross-platform, software and hardware independent tool for transmitting information. Further, XML maintains its data as a hierarchically-structured tree of nodes, each node comprising a tag that may contain descriptive attributes. Typically, a XML namespace is provided to give the namespace a unique name. In some instances, the namespace may be used as a pointer to a centralized location containing default information about the namespace.

In an illustrative embodiment, VoIP Client 606 may identify a XML namespace for contextual information. For example, the XML namespace attribute may be placed in the start tag of a sending element. It is to be understood that XML namespaces, attributes, classes illustrated herein are provided merely as an example of structured hierarchies used in conjunction with various embodiments of the present invention. After VoIP Client 608 receives the XML namespace information, the VoIP Client 606 transmits a set of contextual data packets defined in accordance with the identified XML namespace to VoIP Client 608. When a namespace is defined in the start tag of an element, all child elements with the same prefix are associated with the same namespace. As such, VoIP Client 608 and VoIP Client 606 can transmit contextual information without including prefixes in all the child elements, thereby reducing the amount of data packets transmitted for the contextual information.

With reference to FIGS. 8-12, block diagrams illustrative of various, classes and attributes of structured hierarchies corresponding to VoIP contextual information are shown. The VoIP contextual information exchanged between various VoIP entities (e.g., clients, service providers, etc.) may correspond to a VoIP namespace 800. In one embodiment, the VoIP namespace 800 is represented as a hierarchically structured tree of nodes, each node corresponding to a subclass which corresponds to a subset of VoIP contextual information. For example, a VoIP Namespace 800 may be defined as a hierarchically structured tree comprising a Call Basics Class 802, a Call Contexts Class 810, a Device Type Class 820, a VoIP Client Class 830 and the like.

Figure 9:
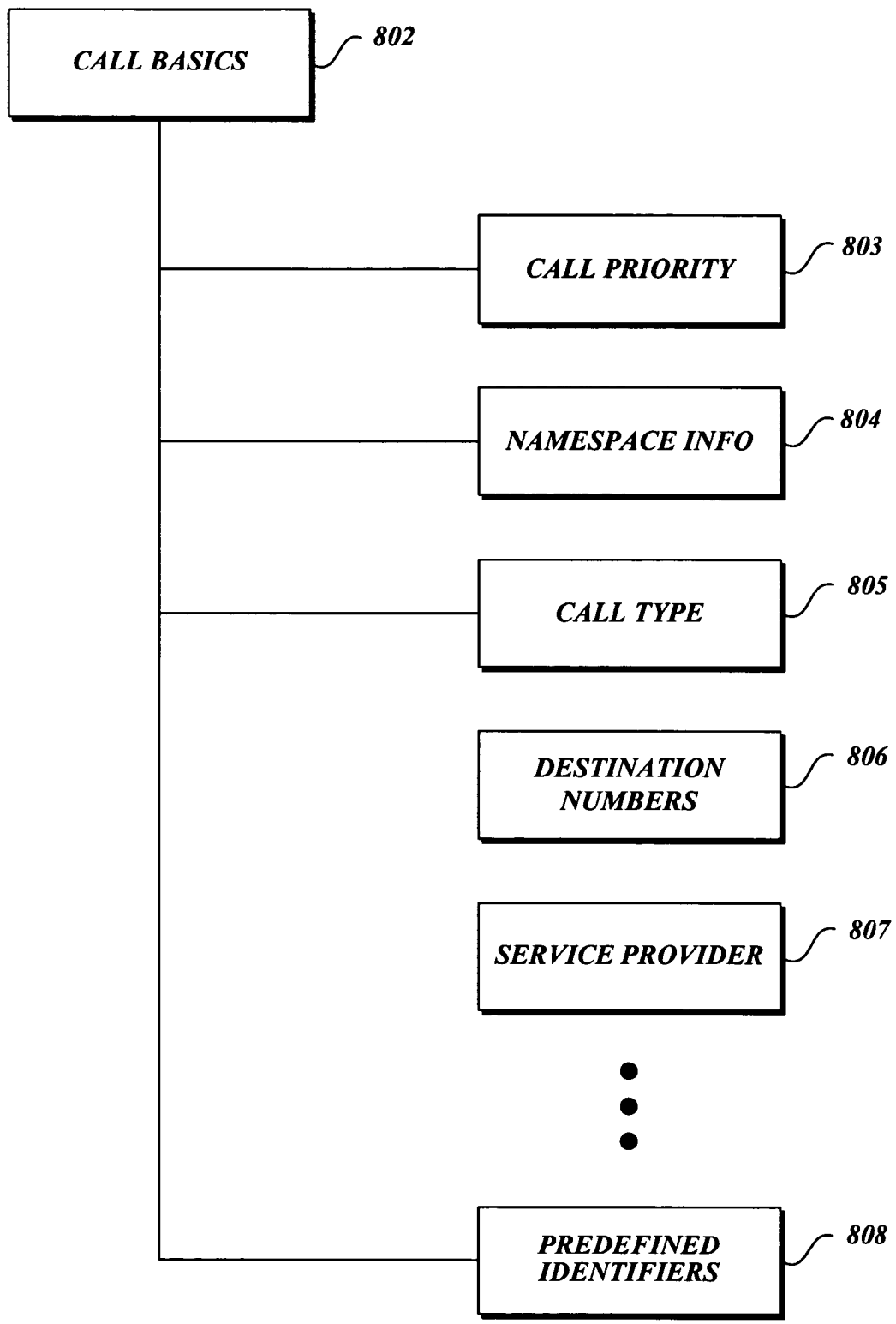

With reference to FIG. 9, a block diagram of a Call Basics Class 802 is shown. In an illustrative embodiment, Call Basics Class 802 may correspond to a subset of VoIP contextual information relating to a conversation channel connection (e.g., a PSTN call connection, a VoIP call connection, and the like). The subset of the VoIP contextual information relating to a conversation channel connection may include originating numbers (e.g., a caller's VoIP ID number), destination numbers (e.g., callees'VoIP ID numbers or telephone numbers), call connection time, VoIP service provider related information, and/or ISP related information such as IP address, MAC address, namespace information and the like. Additionally, the contextual information relating to a conversation channel connection may include call priority information (which defines the priority levels of the destination numbers), call type information, and the like. The call type information may indicate whether the conversation channel is established for an emergency communication, a broadcasting communication, a computer to computer communication, a computer to POTS device communication, and so forth. In one embodiment, the contextual information relating to a conversation channel connection may include predefined identifiers which represent emotions, sounds (e.g., "ah", "oops", "wow", etc.) and facial expressions in graphical symbols. In one embodiment, a Call Basics Class 802 may be defined as a sub-tree structure of a VoIP Namespace 800, which includes nodes such as call priority 803, namespace information 804, call type 805, destination numbers 806, service provider 807, predefined identifiers 808, and the like.

Figure 10:
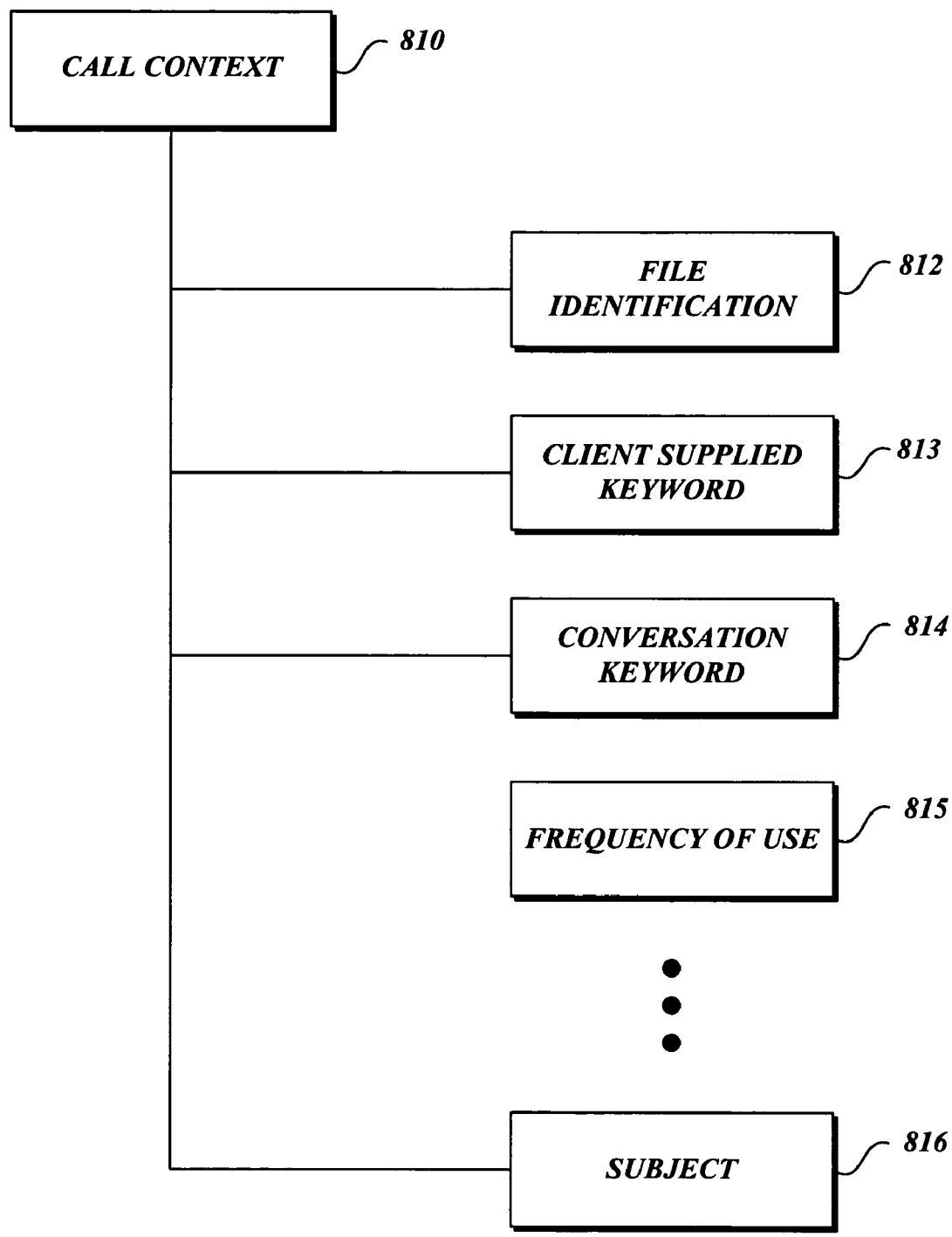

With reference to FIG. 10, a block diagram of a Call Contexts Class 810 is shown. In one embodiment, a subset of VoIP contextual information relating to conversation context may correspond to the Call Contexts Class 810. The contextual information relating to conversation context may include information such as client supplied keywords, identified keywords from document file data, identified keywords from a conversation data packet (e.g., conversation keywords), file names for documents and/or multimedia files exchanged as part of the conversation, game related information (such as a game type, virtual proximity in a certain game), frequency of use (including frequency and duration of calls relating to a certain file, a certain subject, and a certain client), and file identification (such as a case number, a matter number, and the like relating to a conversation), among many others. In accordance with an illustrative embodiment, a Call Contexts Class 810 may be defined as a sub-tree structure of a VoIP Namespace 800, which includes nodes corresponding to file identification 812, client supplied keyword 813, conversation keyword 814, frequency of use 815, subject of the conversation 816, and the like.

Figure 11:
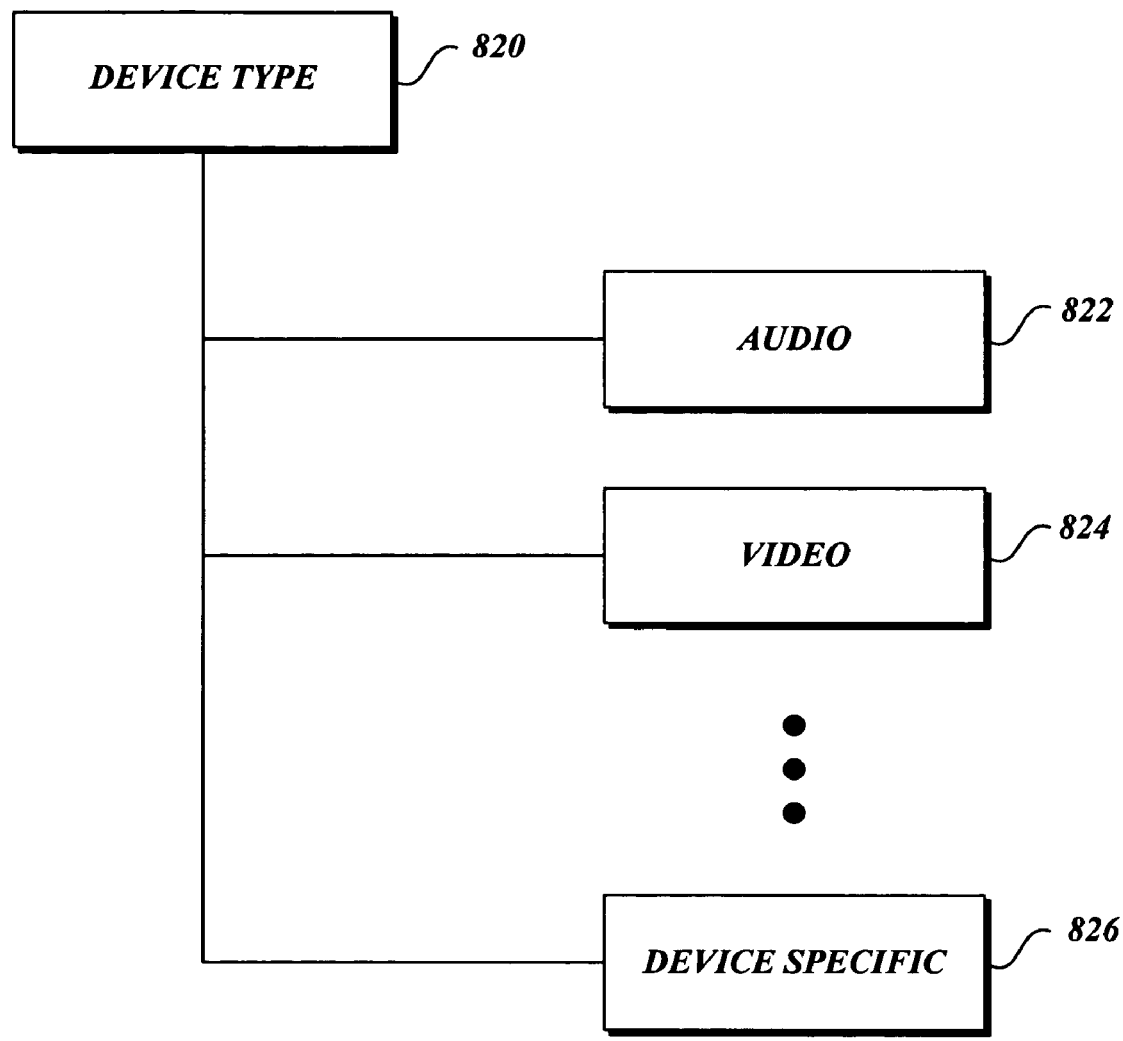

With reference to FIG. 11, a block diagram of a Device Type Class 820 is depicted. In one embodiment, a Device Type Class 820 may correspond to a subset of VoIP contextual information relating to a VoIP client device used for the conversation channel connection. The subset of the VoIP contextual information relating to the VoIP client device may include audio related information which may be needed to process audio data generated by the VoIP client device. The audio related information may include information related to the device's audio functionality and capability, such as sampling rate, machine type, output/input type, microphone, Digital Signal Processing (DSP) card information, and the like. The subset of the VoIP contextual information relating to the VoIP client device may include video related information which may be needed to process video data generated by the VoIP client device. The video related information may include resolution, refresh, type and size of the video data, graphic card information, and the like. The contextual information relating to VoIP client devices may further include other device specific information such as a type of the computer system, processor information, network bandwidth, wireless/wired connection, portability of the computer system, processing settings of the computer system, and the like. In an illustrative embodiment, a Device Type Class 820 may be defined as a sub-tree structure of a VoIP Namespace 800, which includes nodes corresponding to Audio 822, Video 824, Device Specific 826 and the like.

Figure 12:
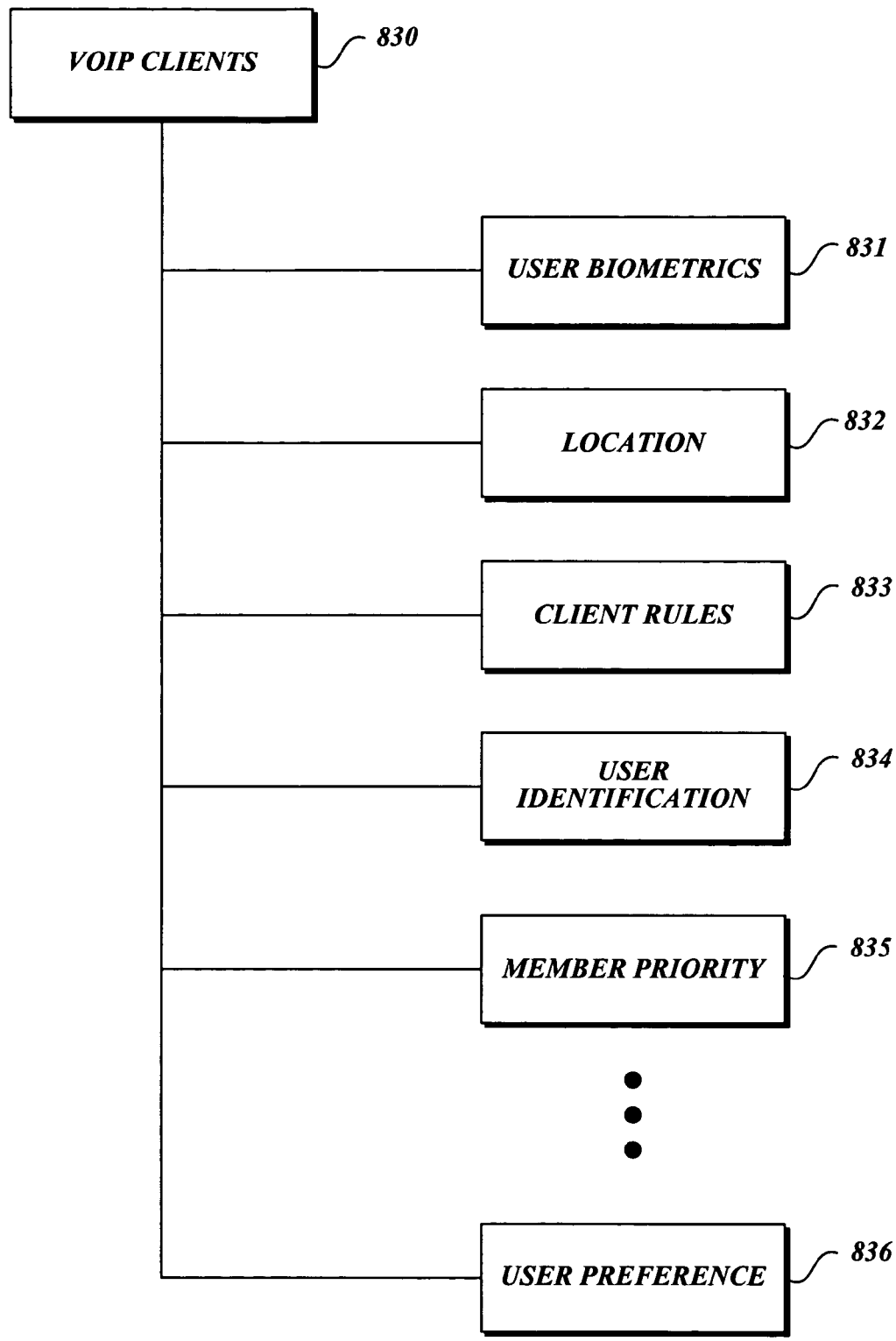

With reference to FIG. 12, a block diagram of a VoIP Client Class 830 is depicted. In accordance with an illustrative embodiment, a VoIP Client Class 830 may correspond to a subset of contextual information relating to VoIP clients. In one embodiment, the subset of the VoIP contextual information relating to the VoIP client may include voice profile information (e.g., a collection of information specifying the tonal and phonetic characteristics of an individual user), digital signature information, and biometric information. The biometric information can include user identification information (e.g., fingerprint) related to biometric authentication, user stress level, user mood, etc. Additionally, the subset of the VoIP contextual information relating to the VoIP client may include location information (including a client defined location, a VoIP defined location, a GPS/triangulation location, and a logical/virtual location of an individual user), assigned phone number, user contact information (such as name, address, company, and the like), rules defined by the client, user preferences, digital rights management (DRM), a member rank of an individual user in an organization, priority associated with the member rank, and the like. The priority associated with the member rank may be used to assign priority to the client for a conference call. In one embodiment, a VoIP Client Class 830 may be defined as a sub-tree structure of a VoIP Namespace 800, which includes nodes corresponding to user biometrics 831, location 832, client rules 833, user identification 834, member priority 835, user preference 836, and the like.

Conversations between VoIP devices often involve the exchange of data packets containing speech data (referred to herein as speech data packets). Speech data packets from more than one device in a conversation may be transmitted in such close temporal proximity that when the speech data packets are received, it is difficult or impossible for the receiving devices to assemble a clearly audible message from one of the sending devices. For example, a VoIP conversation may be established that includes a manager and two employees, with each participant using his or her own individual device for a total of three devices. During the conversation, if more than one participant speaks at the same time, it is difficult for the receiving devices to assemble a clearly audible message. In this example, because the manager is a higher ranking employee, it may be desirable that the manager be heard first or even exclusively.

A way to enable a conversation participant, e.g., a manager, to be heard first or exclusively when more than one participant speaks at the same time is to assign priorities to the participant's devices and filter the speech data packets from each participant according to the priorities. An exemplary priority scheme is one in which the device with the highest priority is assigned a priority value of one and subsequently lower priority devices are assigned priority values of two, three, etc. For example, the manager's device in above example is assigned a high priority value, e.g., a priority of one. One employee is assigned a priority of two; the remaining employee a priority of three.

Before the assigned priorities are applied, it is preferable to set a policy for determining temporal proximity. An exemplary temporal proximity policy is one in which a reasonable time period, e.g., three hundred milliseconds, is selected as a "time window." The speech data packets that arrive at a receiver, or a central service provider, within a time window are treated as though all the speech data packets arrived at the same time. The priorities of the speech data packets in the time window are examined and the speech data packet with the highest priority is transmitted ahead of the other speech data packets in the time window.

As discussed above in FIG. 5, VoIP data packets may contain contextual data in the header that includes device specific data such as priority data for identifying the priorities of devices transmitting data packets in a conversation. The priority data in VoIP data packets may be used along with a temporal proximity policy to determine how to transmit speech data packets arriving in the same time window. An exemplary software program that uses the priority data in the contextual data of VoIP data packets along with a temporal proximity policy to determine how to transmit speech data packets arriving in the same time window is a speech priority service. A speech priority service associates a priority with each device in a conversation, determines which speech data packets are in the same time window, and processes speech data packets received in the same time window according to the priorities. If a device does not have an assigned priority, the speech data packets transmitted by the device may be assigned a priority, usually the lowest priority, and further processed as needed.

Figure 13:
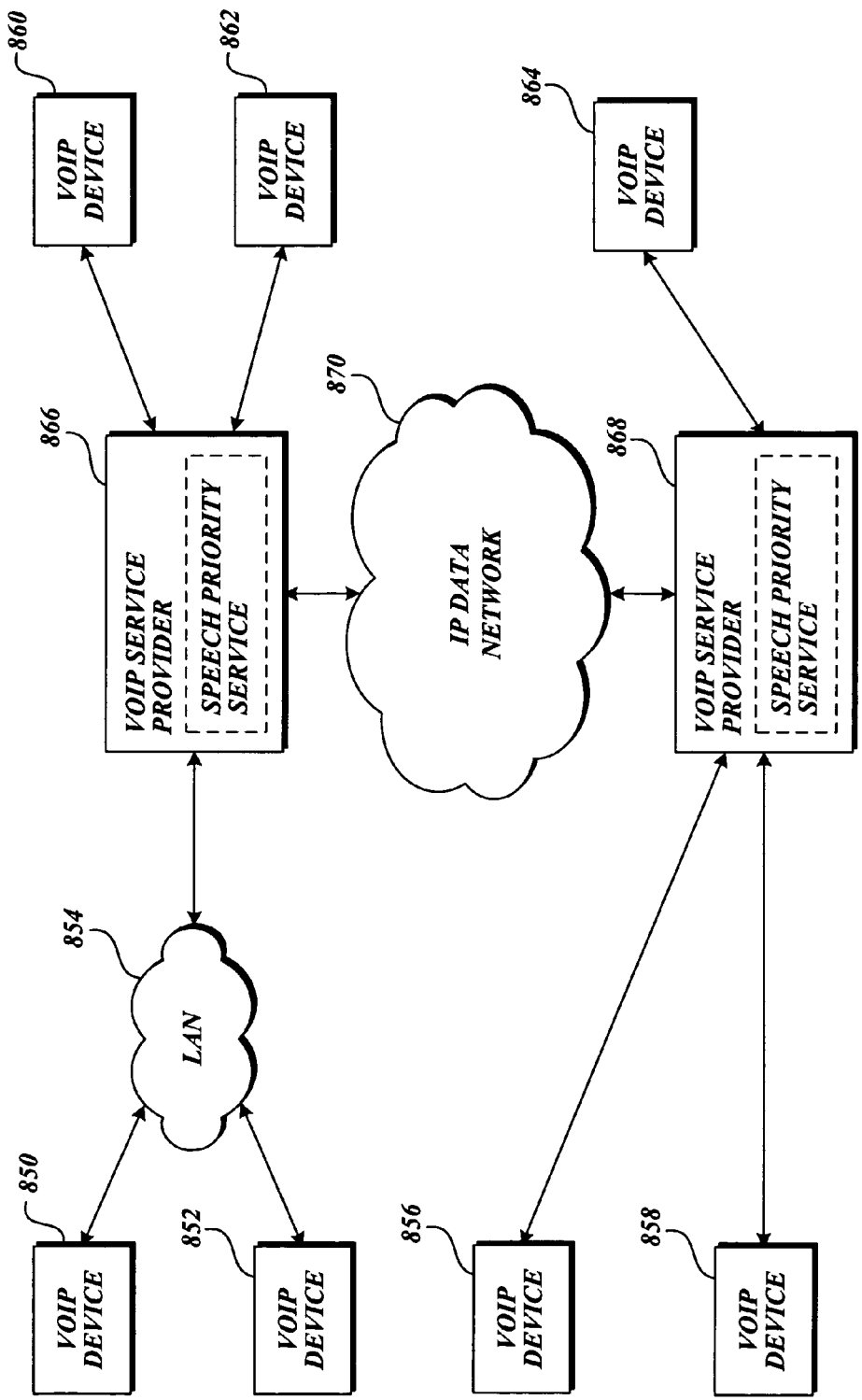
FIG. 13 is a block diagram illustrating an exemplary VoIP system in which an exemplary priority service may operate.

FIG. 13 is a block diagram illustrating an exemplary system in which a speech priority service may operate. In one embodiment, the system may include an IP data network 870 and one or more VoIP service providers 866, 868, on which a speech priority service operates, and a plurality of VoIP devices such as VoIP devices 856, 858, 860, 862, 864 in communication with the VoIP service providers 866, 868. The system may also include additional VoIP devices 850, 852 in communication with the VoIP service provider 866, 868 via a local area network (LAN) 854. VoIP contextual data packets, including priority data, and speech data packets, are transmitted between VoIP devices 850, 852, 856, 858, 860, 862, and 864 by way of the IP data network 870. VoIP devices 850 and 852 transmit data packets to, and receive data packets from, the LAN 854 which in turn transmits the data packets to, and receives the data packets, from VoIP service provider 866. VoIP devices 860 and 862 transmit data packets directly to, and receive data packets directly from, VoIP service provider 866. Similarly, VoIP devices 856, 858, and 864 transmit data packets directly to, and receive data packets directly from, VoIP service provider 868. A speech priority service may operate on one or more servers such as VoIP service providers 866 and 868. A speech priority service may also operate on a VoIP device such as VoIP device 850 or on a combination of VoIP devices and VoIP service providers. Thus, the operation of a speech priority service on a VoIP service provider should be construed as exemplary and not limiting.

In the exemplary system illustrated in FIG. 13 and described above, data packets containing priority data are transmitted to a VoIP service provider, such as VoIP service provider 866 from the VoIP devices that are or will be communicating in a VoIP conversation. The speech priority service operating on VoIP service provider 866 uses the priority data to assign priorities to VoIP devices, such as VoIP devices 850, 856, 864. The priorities are assigned with respect to each device and may be determined based on a variety of factors. A look-up table associating the VoIP devices, such as such as VoIP devices 850, 856, 864, with the priorities assigned to the devices, may be maintained in a service provider such as in the speech priority service operating on VoIP service provider 866. Thus, the look-up table associates a priority with each of the plurality of devices. A look-up table may be built before speech data packets are exchanged during a conversation or built as VoIP devices are added to or removed from a conversation.

Figure 14A:
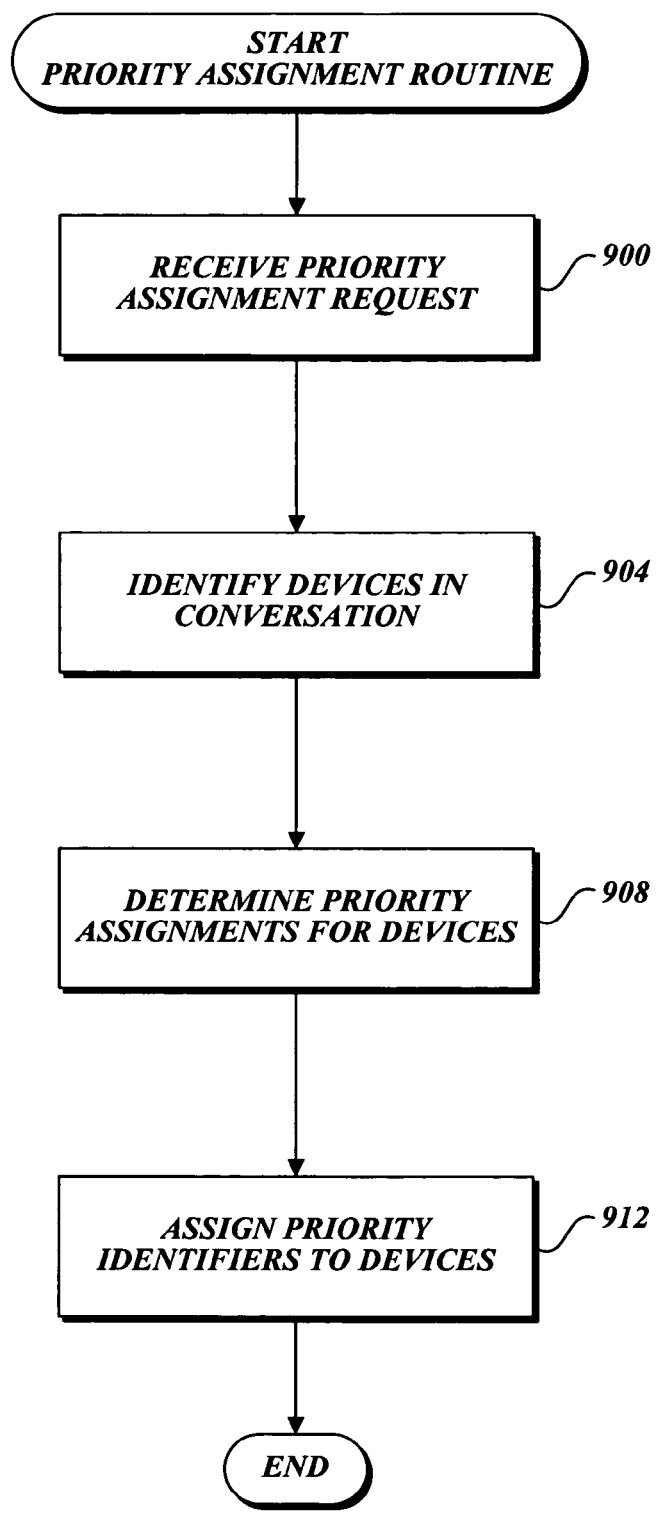
FIG. 14A is an exemplary flow diagram illustrating a process for priority assignment.

FIG. 14A is a functional flow diagram illustrating how a priority may be assigned in accordance with an embodiment of the present invention. The priority assignment routine illustrated in FIG. 14A begins with block 900. At block 900, the speech priority service receives a priority assignment request. In the exemplary VoIP conversation described above, a manager and two employees, each with his or her own individual device participate in a conversation. As each participant's device enters the conversation, each device transmits a priority assignment request to a speech priority service such as the speech priority service operating on VoIP service provider 866. At block 904, devices in a conversation, such as VoIP devices 850, 852, 856, 858, 860, 862, and 864, are identified. For example, the speech priority service receives a priority assignment request from VoIP device 850 and uses data in the priority assignment request, and perhaps in the data packet or packets containing the priority assignment request, to identify the transmitting device as VoIP device 850 and assign a priority to the device. At block 908, priority assignments for the devices are determined. For example, a priority may be associated with a device according to data in a user profile for the user using the device. The priority derived from the user profile data may be associated with the device for the duration of a conversation. It is possible that the user profile data changes during, or after, a conversation and the priority is changed according to the changed user profile data. A priority may also be directly assigned to a device or other data may be used to derive a priority that is associated with a device. Hence, associating a priority with a device according to data in a user profile should be construed as exemplary and not limiting. The assigned priority may be stored in the speech priority service, e.g., in a look-up table maintained by the speech priority service or may be transmitted back to the requesting device to be stored on the device. At block 912, priority identifiers are assigned to the devices.

Priority assignment requests may be transmitted in response to an explicit user action, i.e. manually. Preferably, priority assignment requests are transmitted by a device in response to rules or policies stored on the device, i.e., automatically. It is also possible for the priorities of devices to be changed during a conversation. A device may transmit a priority assignment request to change the currently assigned priority of the device. The speech priority service processes the priority assignment request as described above. Certain privileged entities may also be allowed to send priority assignment requests to change the priorities of devices. For example, in the above example, the manager's device may have permission to send priority assignment requests to change the priorities of the two employees' devices.

Figure 14B:
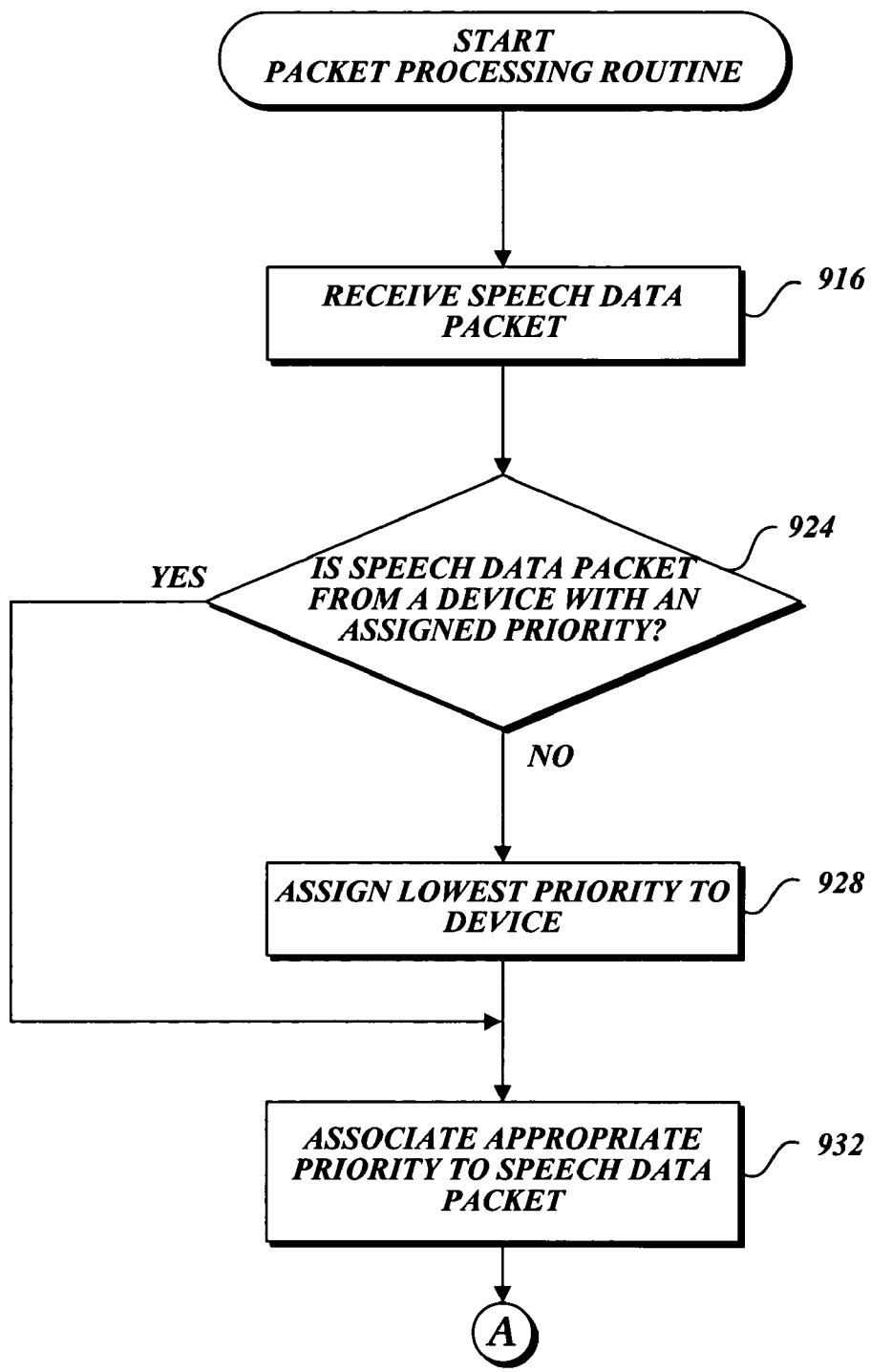
FIGS. 14B-14D comprise an exemplary flow diagram illustrating packet processing in a VoIP system.
Figure 14C:
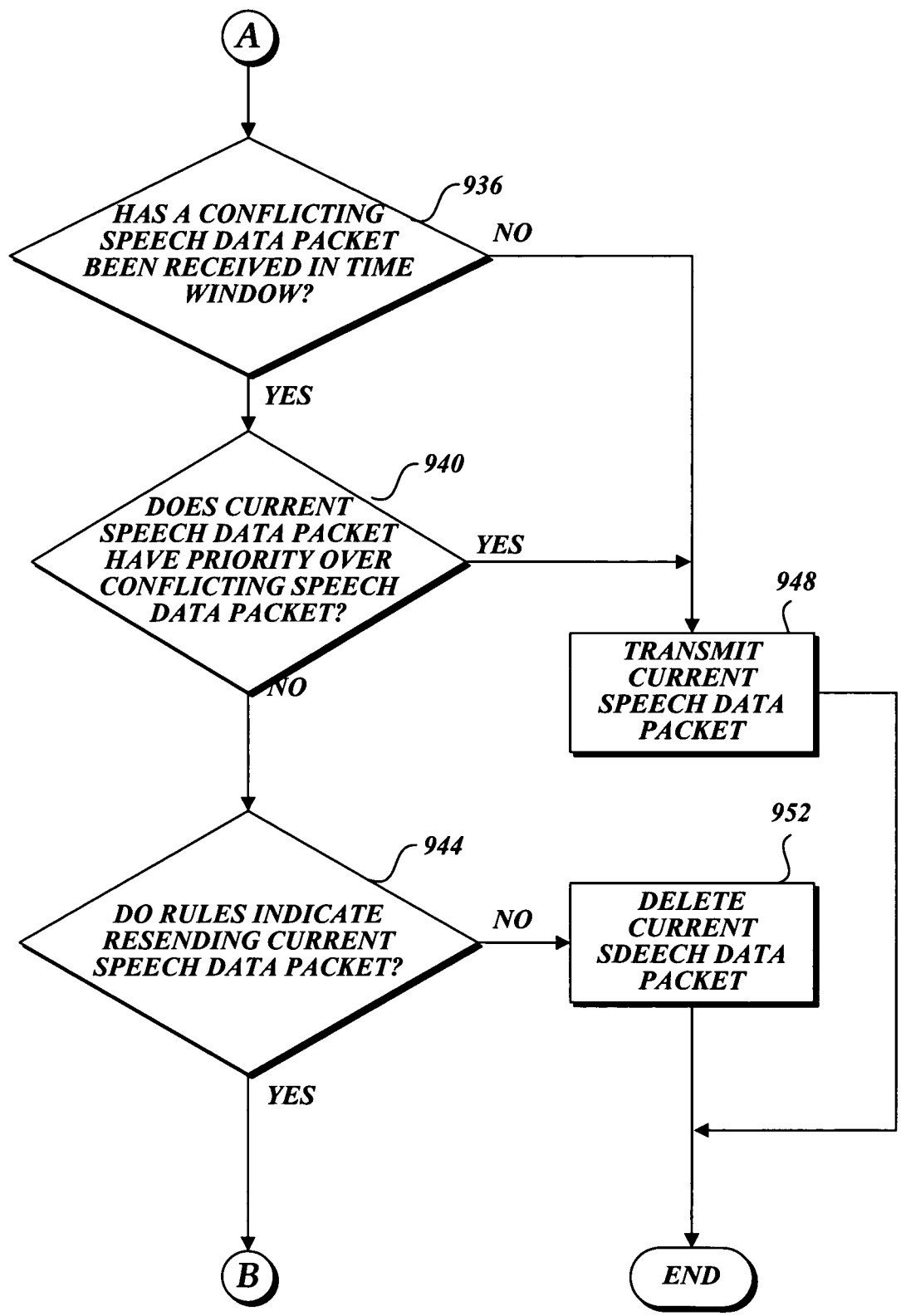
Figure 14D:
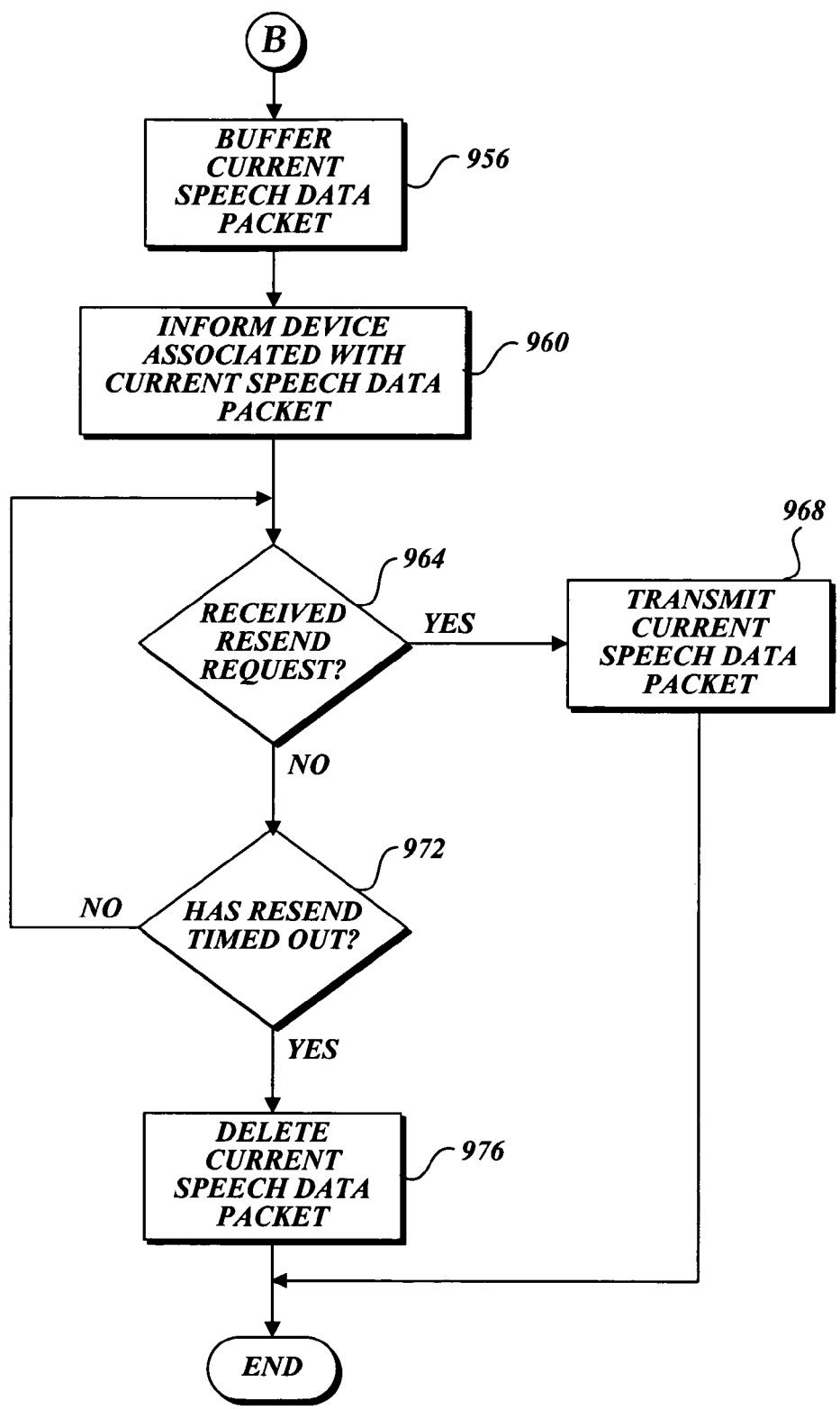

After speech priorities are assigned to devices, speech data packets may be processed based on the assigned priorities. FIGS. 14B-14D comprise a functional flow diagram that illustrates an exemplary packet processing routine in which data packets are processed according to priority. The packet processing routine begins at block 916 in which a data packet is received by a speech priority service such as the speech priority service operating on VoIP service provider 866. At decision block 924 it is determined if the data packet is from a device with an assigned priority. Depending on the structure of the speech priority service, device priority may be included in the received data packet or maintained by the speech priority service. If priority is to be included in the data packet, the speech priority service may check the data packet to determine if the data packet is from a device with an assigned priority. If priority is maintained by the speech priority service, the speech priority service may identify the transmitting device using, for example, information contained in the data packet, and determine if a priority is assigned to the transmitting device. If the data packet is from a device with an assigned priority, the process continues to block 932. If it is determined that the data packet is from a device that is not assigned a priority, at block 928 the lowest priority is assigned to the device from which the data packet was received. At block 932, the appropriate priority, i.e., the priority assigned to the device, is associated with the data packet.

Continuing in FIG. 14C, at decision block 936, it is determined if a conflicting data packet has been received. A conflicting data packet is a data packet that has been received within the same time window as the current data packet. For example, within a time window, three packets may be received. The priorities of the three data packets are determined and compared. The data packet with the highest priority is transmitted and the data packets with lower priorities are either buffered and later transmitted, or deleted, as illustrated later in the control flow. If, at decision block 936 no conflicting data packet has been received, at block 948, the current data packet is transmitted and the process ends. If at decision block 936 a conflicting data packet has been received in the same time window as the current data packet, at decision block 940, the current data packet's priority is compared with the conflicting data packet's priority and it is determined which of the two data packets has the higher priority. If the current data packet has a higher priority than the conflicting data packet, at block 948 the current data packet is transmitted and then the process ends.

If at decision block 940 it is determined that the current data packet does not have priority over the conflicting data packet, at decision block 944 it is determined if there are rules to indicate how to resend, i.e., retransmit, the current data packet. If there are no rules or policies to indicate how to retransmit the current data packet, at block 952 the current data packet is deleted and the process ends. If at decision block 944 it is determined that there are rules that indicate that the current data packet should be retransmitted and there are rules dictating how that is to be done, then the process flows to block 956 in FIG. 14D.

The branch of the process illustrated on FIG. 14D is an exemplary process indicating how a current data packet may be buffered and retransmitted. The retransmitting policy illustrated in FIG. 14D uses a time window and a predetermined resend time. It is to be appreciated that there may be other rules or policies used to decide when and how to resend a current data packet. For example, instead of deleting a current data packet after the resend time has elapsed, the current data packet may be transmitted. Thus, using time windows and resend times to determine how to retransmit a current data packet should be construed as exemplary and not limiting.

The retransmitting policy illustrated in FIG. 14D begins at block 956 in which the current data packet is placed in a buffer. At block 960 the device with which the current data packet is associated is informed that the current data packet has been buffered and may be resent. Optionally, the device with which the current data packet is associated may inform other software components, e.g., a user interface, that the current data packet has been buffered and may be resent. At decision block 964 it is determined if a resend request has been received. A resend request may come from the device associated with the current data packet or may come from another source, e.g., another device. If no resend request has been received, at decision block 972 it is determined if the resend window has timed out. If the resend time period has not timed out then the control flows back to decision block 964 to await for a resend request. If at decision block 964 a resend request is received, then control flows to block 968 where the current data packet is transmitted and then the process ends. At decision block 972, if the time period has timed out, at block 976 the current data packet is deleted and the process ends.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for processing speech data packets passed between a plurality of devices in a conversation, comprising:
    identifying a plurality of devices in a conversation;
    determining a priority for each of the plurality of devices in the conversation;
    associating a priority with each of the plurality of devices;
    receiving a first speech data packet received from a first of the plurality of devices;
    receiving a second speech data packet from a second device of the plurality of devices;
    determining priorities of the first speech data packet and the second speech data packet based on the priorities associated with the first device and the second device;
    transmitting the speech data packet with a highest priority; and
    using a predetermined policy to process the speech data packet that was not transmitted;
    wherein the priority associated with at least one of the plurality of devices changes during the conversation.

2. A method for processing speech data packets, comprising:
    associating a priority with each of a plurality of devices in a conversation;
    receiving from the plurality of devices a plurality of contextual data packets including the associated priorities of the plurality of devices;
    assigning priorities for each of the plurality of devices using the associated priorities from the contextual data packets received from the plurality of devices
    receiving a plurality of speech data packets from the plurality of devices;
    determining whether any of the speech data packets are received from at least two of the plurality of prioritized devices within a predetermined time window;
    when speech data packets are received from in different predetermined time windows, transmitting the packets according to the order received; and
    when speech data packets are received from at least two of the plurality of prioritized devices within a predetermined time window:
    identifying relative priorities of any speech data packets received from the at least two prioritized devices within a predetermined time window;
    transmitting a speech data packet received from the at least two prioritized devices within a predetermined time window having a highest relative priority; and
    processing remaining speech data packets received from the plurality of devices within a predetermined time window according to a predetermined policy for processing speech data packets received within a predetermined window that do not have the highest priority.

3. The method of claim 2, wherein associating a priority with each of the plurality of devices in the conversation comprises:
    identifying the plurality of devices in the conversation;
    determining a priority for each of the plurality of devices in the conversation; and
    associating a priority with each of the plurality of devices.

4. The method of claim 3, wherein associating a priority with each of the plurality of devices includes manually assigning priorities to devices.

5. The method of claim 3, wherein the conversation includes a device that is not assigned a priority.

6. The method of claim 2, wherein the method is implemented by a speech priority service that operates on a service provider.

7. The method of claim 2, wherein the priority associated with at least one of the plurality of devices changes during the conversation.

8. The method of claim 2, wherein the method is implemented by a speech priority service that operates on each device in the conversation.

9. The method of claim 2, wherein the predetermined policy is to delete the speech data packet that was not transmitted.

10. The method of claim 2, wherein the predetermined policy is to buffer the speech data packet that was not transmitted.

11. The method of claim 10, wherein the buffered speech data packet is transmitted in response to a request.

12. The method of claim 11, wherein the buffered speech data packet is transmitted after a predetermined amount of time.

13. A speech processing system, comprising:
a priority assignment component associating a priority with each of a plurality of devices in a conversation;
a speech data packet processing component receiving from the plurality of devices a plurality of contextual data packets including the associated priorities of the plurality of devices, assigning priorities for each of the plurality of devices using the associated priorities from the contextual data packets received from the plurality of devices and receiving a plurality of speech data packets from the plurality of devices;
a conflict resolution component determining whether any of the speech data packets are received from at least two of the plurality of prioritized devices within a predetermined time window; and:
when speech data packets are received from in different predetermined time windows, transmitting the packets according to the order received; and
when speech data packets are received from at least two of the plurality of prioritized devices within a predetermined time window:
identifying relative priorities of any speech data packets received from the at least two prioritized devices within a predetermined time window;
transmitting a speech data packet received from the at least two prioritized devices within a predetermined time window having a highest relative priority; and
processing remaining speech data packets received from the plurality of devices within a predetermined time window according to a predetermined policy for processing speech data packets received within a predetermined window.

14. The speech processing system of claim 13, wherein speech data packets received within the time window that are not to be transmitted are buffered.

15. The speech processing system of claim 13, wherein speech data packets received within the time window that are not to be transmitted are deleted.

16. The speech processing system of claim 13 further comprising a notification component notifying a device that transmitted a speech data packet received within the time window that was determined not to be transmitted.

17. A non-transitory computer readable medium including executable instructions which, when executed, process speech data packets, by:
associating a priority with each of a plurality of devices in a conversation;
receiving from the plurality of devices a plurality of contextual data packets including the associated priorities of the plurality of devices;
assigning priorities for each of the plurality of devices using the associated priorities from the contextual data packets received from the plurality of devices
receiving a plurality of speech data packets from the plurality of devices;
determining whether any of the speech data packets are received from at least two of the plurality of prioritized devices within a predetermined time window;
when speech data packets are received from in different predetermined time windows, transmitting the packets according to the order received; and
when speech data packets are received from at least two of the plurality of prioritized devices within a predetermined time window:
identifying relative priorities of any speech data packets received from the at least two prioritized devices within a predetermined time window;
transmitting a speech data packet received from the at least two prioritized devices within a predetermined time window having a highest relative priority; and
processing remaining speech data packets received from the plurality of devices within a predetermined time window according to a predetermined policy for processing speech data packets received within a predetermined window.

18. The non-transitory computer readable medium of claim 17, further comprising notifying the second device that the second speech data packet was not transmitted.

19. The non-transitory computer readable medium of claim 17, further comprising:
determining if the first device and the second device are assigned a priority; and
if it is determined that the second device is not assigned a priority, associating a lowest priority with the second speech data packet.

* * * * *